US011902769B2

(12) United States Patent
Terentiv et al.

(10) Patent No.: US 11,902,769 B2
(45) Date of Patent: Feb. 13, 2024

(54) METHODS, APPARATUS AND SYSTEMS FOR REPRESENTATION, ENCODING, AND DECODING OF DISCRETE DIRECTIVITY DATA

(71) Applicant: Dolby International AB, Amsterdam Zuidoost (NL)

(72) Inventors: Leon Terentiv, Nuremberg (DE); Christof Fersch, Nuremberg (DE); Daniel Fischer, Nuremberg (DE)

(73) Assignee: Dolby International AB, Dublin (IE)

( * ) Notice: Subject to any disclaimer, the term of this patent is extended or adjusted under 35 U.S.C. 154(b) by 227 days.

(21) Appl. No.: 17/621,547

(22) PCT Filed: Jun. 30, 2020

(86) PCT No.: PCT/EP2020/068380
§ 371 (c)(1),
(2) Date: Dec. 21, 2021

(87) PCT Pub. No.: WO2021/001358
PCT Pub. Date: Jan. 7, 2021

(65) Prior Publication Data

US 2022/0377484 A1 Nov. 24, 2022

Related U.S. Application Data

(60) Provisional application No. 62/869,622, filed on Jul. 2, 2019.

(30) Foreign Application Priority Data

Jul. 2, 2019 (EP) .................................... 19183862

(51) Int. Cl.
*H04S 7/00* (2006.01)
*G10L 19/008* (2013.01)
(Continued)

(52) U.S. Cl.
CPC ............ *H04S 7/302* (2013.01); *G10L 19/008* (2013.01); *H04S 3/008* (2013.01); *H04S 2400/01* (2013.01);
(Continued)

(58) Field of Classification Search
None
See application file for complete search history.

(56) References Cited

U.S. PATENT DOCUMENTS 9,179,236 B2 11/2015 Robinson
9,973,874 B2 5/2018 Stein
(Continued)

FOREIGN PATENT DOCUMENTS

CN 106093866 A 11/2016
CN 104464739 B 8/2017
(Continued)

OTHER PUBLICATIONS

AES69-2015, Spatial Acoustic Data File Format.
(Continued)

*Primary Examiner* — Qin Zhu

(57) ABSTRACT

The present disclosure relates to a method of processing audio content including directivity information for at least one sound source, the directivity information comprising a first set of first directivity unit vectors representing directivity directions and associated first directivity gains. The disclosure further relates to corresponding methods of encoding and decoding audio content including directivity information for at least one sound source.

17 Claims, 12 Drawing Sheets

(51) Int. Cl.
*H04S 3/00* (2006.01)
*H04S 3/02* (2006.01)

(52) U.S. Cl.
CPC ....... *H04S 2400/11* (2013.01); *H04S 2400/13* (2013.01); *H04S 2420/03* (2013.01)

(56) References Cited

U.S. PATENT DOCUMENTS

| | | | | |
|---|---|---|---|---|
| 10,284,947 | B2 * | 5/2019 | Del Galdo | H04R 3/005 |
| 2003/0170006 | A1 | 9/2003 | Bogda | |
| 2007/0020359 | A1 | 4/2007 | Seo et al. | |
| 2010/0284281 | A1 | 11/2010 | Sperschneider | |
| 2011/0249822 | A1 | 10/2011 | Jaillet | |
| 2011/0249899 | A1 | 10/2011 | Wu | |
| 2013/0216070 | A1 | 8/2013 | Keiler | |
| 2014/0198918 | A1 | 7/2014 | Li et al. | |
| 2014/0270245 | A1 * | 9/2014 | Elko | H04R 3/005 381/92 |
| 2017/0063960 | A1 | 3/2017 | Stockhammer | |
| 2020/0143815 | A1 * | 5/2020 | Bernard | H04R 5/027 |

FOREIGN PATENT DOCUMENTS

| | | | |
|---|---|---|---|
| CN | 110089134 | B | 8/2019 |
| CN | 105976822 | B | 12/2019 |
| CN | 108419174 | B | 5/2020 |
| EP | 2960903 | A1 | 12/2015 |
| EP | 2165328 | B1 | 1/2018 |
| EP | 3297298 | B1 | 5/2020 |
| EP | 3471092 | B1 | 7/2020 |
| EP | 3327721 | B1 | 11/2020 |
| JP | 2011221688 | A | 11/2011 |
| RU | 2651190 | C2 | 11/2017 |

OTHER PUBLICATIONS

Hardina, D.P. et al. "A Comparison of Popular Point Configurations on S2" (2016) Dolomites Research Notes on Approximation: vol. 9, pp. 16-49.

Kogan, Jonathan "A New Computationally Efficient Method for Spacing n Points on a Sphere" (2017) Rose-Hulman Undergraduate Mathematics Journal: vol. 18, Issue 2, Article 5.

Wefers, F. et al."Audio Encoder Input Specification for the "Singer In The Lab" scene" ISO/IEC SC29 M47454 Mar. 2019, Geneva, CH, pp. 1-5.

* cited by examiner

METHODS, APPARATUS AND SYSTEMS FOR REPRESENTATION, ENCODING, AND DECODING OF DISCRETE DIRECTIVITY DATA

CROSS-REFERENCE TO RELATED APPLICATIONS

This application is a U.S. National Stage of International Application No. PCT/EP2020/068380 filed 30 Jun. 2020, which claims priority of the following priority applications: U.S. provisional application 62/869,622 (reference: D19038USP1), filed 2 Jul. 2019 and EP application 19183862.2 (reference: D19038EP), filed 2 Jul. 2019, which are hereby incorporated by reference.

TECHNICAL FIELD

The present disclosure relates to providing methods and apparatus for processing and coding of audio content including discrete directivity information (directivity data) for at least one sound source. In particular, the present disclosure relates to representation, encoding, and decoding of discrete directivity information.

BACKGROUND

Real-world sound sources, both natural or man-made (e.g., loudspeakers, musical instruments, voice, mechanical devices), radiate sound in a non-isotropic way. Characterizing the complex radiation patterns (or "directivity") of a sound source can be critical to a proper rendering, in particular in the context of interactive environments such as video games, and virtual/augmented reality applications. In these environments, the users can generally interact with the directional audio objects by walking around them, therefore changing their auditory perspective on the generated sound. They may also be able to grab and dynamically rotate the virtual objects, again requiring the rendering of different directions in the radiation pattern of the corresponding sound source(s). In addition to a more realistic rendering of the direct propagation effects from a source to a listener, the radiation characteristics will also play a major role in the higher-order acoustical coupling between a source and its environment (e.g., the virtual environment in a video game), therefore affecting the reverberated sound. As a result, it will impact other spatial cues such as perceived distance.

The radiation pattern of a sound source, or its parametric representation, must be transmitted as metadata to a 6-Degrees-of-Freedom (6DoF) audio renderer. Radiation patterns can be represented by means of, for example, spherical harmonics decomposition or discrete vector data.

However, as has been found, direct application of conventional discrete directivity representations is sub-optimal for 6DoF rendering.

Thus, there is a need for methods and apparatus for improved representation and/or improved coding schemes of discrete directivity data (directivity information) of directional sound sources.

SUMMARY

An aspect of the disclosure relates to a method of processing audio content including directivity information for at least one sound source. The method may be performed at an encoder in the context of encoding. Alternatively, the method may be performed at a decoder, prior to rendering.

The sound source may be a directional sound source and/or may relate to an audio object, for example. The directivity information may be discrete directivity information. Further, the directivity information may be part of metadata for the audio object. The directivity information may include a first set of first directivity unit vectors representing directivity directions and associated first directivity gains. The first directivity unit vectors may be non-uniformly distributed on the surface of the 3D sphere. Unit vector shall mean unit-length vector. The method may include determining, as a count number, a number of unit vectors for arrangement on a surface of a 3D sphere, based on a desired representation accuracy (orientation representation accuracy). The step of determining may also be said to relate to determining, based on the desired representation accuracy, a number of unit vectors to be generated, for arrangement on the surface of the 3D sphere. The determined number of unit vectors may be defined as the cardinality of a set consisting of the unit vectors. The desired representation accuracy may be a desired angular accuracy or a desired directional accuracy, for example. Further, the desired representation accuracy may correspond to a desired angular resolution (e.g., in terms of degrees). The method may further include generating a second set of second directivity unit vectors by using a predetermined arrangement algorithm to distribute the determined number of unit vectors on the surface of the 3D sphere. The predetermined arrangement algorithm may be an algorithm for approximately uniform spherical distribution of the unit vectors on the surface of the 3D sphere. The predetermined arrangement algorithm may scale with the number of unit vectors to be arranged/generated (i.e., the number may be a control parameter of the predetermined arrangement algorithm). The method may further include determining, for the second directivity unit vectors, associated second directivity gains based on the first directivity gains of one or more among a group of first directivity unit vectors that are closest to the respective second directivity unit vector. The group of first directivity unit vectors may be a proper subgroup or proper subset in the first set of first directivity unit vectors.

Configured as described above, the proposed method provides for a representation (i.e., the determined number and the second directivity gains) of the discrete directivity information that allows for rendering at a decoder without need for interpolation to provide a 'uniform response' on the object-to-listener orientation change. Moreover, the representation of the discrete directivity information can be encoded with low bitrate since the perceptually relevant directivity unit vectors are not stored in the representation but can be calculated at the decoder. Finally, the proposed method can reduce computational complexity at the time of rendering.

In some embodiments, the number of unit vectors may be determined such that the unit vectors, when distributed on the surface of the 3D sphere by the predetermined arrangement algorithm, would approximate the directions indicated by the first set of first directivity unit vectors up to the desired representation accuracy.

In some embodiments, the number of unit vectors may be determined such that when the unit vectors were distributed on the surface of the 3D sphere by the predetermined arrangement algorithm, there would be, for each of the first directivity unit vectors in the first set, at least one among the unit vectors whose direction difference with respect to the respective first directivity unit vector is smaller than the desired representation accuracy. The direction difference may be an angular distance, for example. The direction difference may be defined in terms of a suitable direction difference norm.

In some embodiments, determining the number of unit vectors may involve using a pre-established functional relationship between representation accuracies and corresponding numbers of unit vectors that are distributed on the surface of the 3D sphere by the predetermined arrangement algorithm and that approximate the directions indicated by the first set of first directivity unit vectors up to the respective representation accuracy.

In some embodiments, determining the associated second directivity gain for a given second directivity unit vector may involves setting the second directivity gain to the first directivity gain associated with that first directivity unit vector that is closest (closeness in the context of the present disclosure being defined by an appropriate distance norm) to the given second directivity unit vector. Alternatively, this determination may involve stereographic projection or triangulation, for example.

In some embodiments, the predetermined arrangement algorithm may involve superimposing a spiraling path on the surface of the 3D sphere, extending from a first point on the sphere to a second point on the sphere, opposite the first point, and successively arranging the unit vectors along the spiraling path. Therein, the spacing of the spiraling path and/or the offsets between respective two adjacent unit vectors along the spiraling path may be determined based on the number of unit vectors.

In some embodiments, determining the number of unit vectors may further involve mapping (e.g., rounding) the number of unit vectors to one of predetermined numbers. The predetermined numbers can be signaled by a bitstream parameter. For example, the bitstream parameter may be a two-bit parameter, such as a directivity_precision parameter. For encoding, the method may then include encoding the determined number into a value of the bitstream parameter.

In some embodiments, the desired representation accuracy may be determined based on a model of perceptual directivity sensitivity thresholds of a human listener (e.g., reference human listener).

In some embodiments, the cardinality of the second set of second directivity unit vectors may be smaller than the cardinality of the first set of first directivity unit vectors. This may imply that the desired representation accuracy is smaller than the representation accuracy provided for by the first set of first directivity unit vectors.

In some embodiments, the first and second directivity unit vectors may be expressed in spherical or Cartesian coordinate systems. For example, the first directivity unit vectors may be uniformly distributed in the azimuth-elevation plane, which implies non-uniform (spherical) distribution on the surface of the 3D sphere. The second directivity unit vectors may be non-uniformly distributed in the azimuth-elevation plane, in such manner that they are (semi-) uniformly distributed on the surface of the 3D sphere.

In some embodiments, the directivity information represented by the first set of first directivity unit vectors and associated first directivity gains may be stored in the Spatially Oriented Format for Acoustics (SOFA format), including formats standardized by the Audio Engineering Society (see e.g., AES69-2015). Additionally or alternatively, the directivity information represented by the second set of first directivity unit vectors and associated second directivity gains may be stored in the SOFA format.

In some embodiments, the method may be a method of encoding the audio content and may further include encoding the determined number of unit vectors together with the second directivity gains into a bitstream. The method may yet further include outputting the bitstream. This assumes that at least part of the proposed method is performed at the encoder side.

Another aspect of the disclosure relates to a method of decoding audio content including directivity information for at least one sound source. The directivity information may include a number (e.g., count number) that indicates a number of approximately uniformly distributed unit vectors on a surface of a 3D sphere, and, for each such unit vector, an associated directivity gain. The unit vectors may be assumed to be distributed on the surface of the 3D sphere by a predetermined arrangement algorithm. Therein, the predetermined arrangement algorithm may be an algorithm for approximately uniform spherical distribution of the unit vectors on the surface of the 3D sphere. The method may include receiving a bitstream including the audio content. The method may further include extracting the number and the directivity gains from the bitstream. The method may yet further include determining (e.g., generating) a set of directivity unit vectors by using the predetermined arrangement algorithm to distribute the number of unit vectors on the surface of the 3D sphere. In this sense, the number of unit vectors may act as a control parameter of the predetermined arrangement algorithm. The method may further include a step of associating each directivity unit vector with its directivity gain. This aspect assumes that the proposed method is distributed between the encoder side and the decoder side.

In some embodiments, the method may further include, for a given target directivity unit vector pointing from the sound source towards a listener position, determining a target directivity gain for the target directivity unit vector based on the associated directivity gains of one or more among a group of directivity unit vectors that are closest to the target directivity unit vector. The group of directivity unit vectors may be a proper subgroup or proper subset in the set of directivity unit vectors.

In some embodiments, determining the target directivity gain for the target directivity unit vector may involve setting the target directivity gain to the directivity gain associated with that directivity unit vector that is closest to the target directivity unit vector.

Another aspect of the disclosure relates to a method of decoding audio content including directivity information for at least one sound source. The directivity information may include a first set of first directivity unit vectors representing directivity directions and associated first directivity gains. The method may include receiving a bitstream including the audio content.

The method may further include extracting the first set of directivity unit vectors and the associated first directivity gains from the bitstream. The method may further include determining, as a count number, a number of vectors for arrangement on a surface of a 3D sphere, based on a desired representation accuracy. The method may further include generating a second set of second directivity unit vectors by using a predetermined arrangement algorithm to distribute the determined number of unit vectors on the surface of the 3D sphere. Therein, the predetermined arrangement algorithm may be an algorithm for approximately uniform spherical distribution of the unit vectors on the surface of the 3D sphere. The method may further include determining, for the second directivity unit vectors, associated second directivity gains based on the first directivity gains of one or more among a group of first directivity unit vectors that are closest to the respective second directivity unit vector. The method may yet further include, for a given target directivity unit vector pointing from the sound source towards a listener position, determining a target directivity gain for the target directivity unit vector based on the associated second directivity gains of one or more among a group of second directivity unit vectors that are closest to the target directivity unit vector. The group of second directivity unit vectors may be a proper subgroup or proper subset in the second set of second directivity unit vectors. This aspect assumes that all of the proposed method is performed at the decoder side.

In some embodiments, determining the target directivity gain for the target directivity unit vector may involve setting the target directivity gain to the second directivity gain associated with that second directivity unit vector that is closest to the target directivity unit vector.

In some embodiments, the method may further include extracting an indication from the bitstream of whether the second set of directivity unit vectors should be generated. This indication may be a 1-bit flag, e.g., a directivity_type parameter. The method may further include determining the number of unit vectors and generating the second set of second directivity unit vectors if the indication indicates that the second set of directivity unit vectors should be generated. Otherwise, the number of unit vectors and the (second) directivity gains may be extracted from the bitstream.

Another aspect of the disclosure relates to an apparatus for processing audio content including directivity information for at least one sound source. The directivity information may include a first set of first directivity unit vectors representing directivity directions and associated first directivity gains. The apparatus may include a processor adapted to perform the steps of the method according to the first aspect described above and any of its embodiments.

Another aspect of the disclosure relates to an apparatus for decoding audio content including directivity information for at least one sound source. The directivity information may include a number that indicates a number (e.g., count number) of approximately uniformly distributed unit vectors on a surface of a 3D sphere, and, for each such unit vector, an associated directivity gain. The unit vectors may be assumed to be distributed on the surface of the 3D sphere by a predetermined arrangement algorithm. Therein, the predetermined arrangement algorithm may be an algorithm for approximately uniform spherical distribution of the unit vectors on the surface of the 3D sphere. The apparatus my include a processor adapted to perform the steps of the method according to the second aspect described above and any of its embodiments.

Another aspect of the disclosure relates to an apparatus for decoding audio content including directivity information for at least one sound source. The directivity information may include a first set of first directivity unit vectors representing directivity directions and associated first directivity gains. The apparatus may include a processor adapted to perform the steps of the method according to the third aspect described above and any of its embodiments.

Another aspect of the disclosure relates to a computer program including instructions that, when executed by a processor, cause the processor to perform the method according to any one of the first to third aspects described above and any of their embodiments.

Another aspect of the disclosure relates to a computer-readable medium storing the computer program of the preceding aspect.

Another aspect of the disclosure relates to an audio decoder including a processor coupled to a memory storing instructions for the processor. The processor may be adapted to perform the method according respective ones of the above aspects or embodiments.

Another aspect of the disclosure relates to an audio encoder including a processor coupled to a memory storing instructions for the processor. The processor may be adapted to perform the method according respective ones of the above aspects or embodiments.

Further aspects of the disclosure relate to corresponding computer programs and computer-readable storing media.

It will be appreciated that method steps and apparatus features may be interchanged in many ways. In particular, the details of the disclosed method can be implemented as an apparatus adapted to execute some or all or the steps of the method, and vice versa, as the skilled person will appreciate. In particular, it is understood that respective statements made with regard to the methods likewise apply to the corresponding apparatus, and vice versa.

BRIEF DESCRIPTION OF THE DRAWINGS

Example embodiments of the disclosure are explained below with reference to the accompanying drawings, wherein like reference numbers indicate like or similar elements, and wherein FIG. 1A, FIG. 1B, and FIG. 1C schematically illustrate examples of a representation of directivity information including discrete directivity unit vectors and associated directivity gains, FIG. 2 schematically illustrates an example of a directivity unit vector and its associated directivity gain, FIG. 3 schematically illustrates an example of an arrangement of directivity unit vectors on a surface of a 3D sphere in accordance with a desired representation accuracy, FIG. 4 schematically illustrates another example of an arrangement of a directivity unit vector on the surface of the 3D sphere in accordance with a desired representation accuracy.

DETAILED DESCRIPTION

As indicated above, identical or like reference numbers in the disclosure indicate identical or like elements, and repeated description thereof may be omitted for reasons of conciseness.

Audio formats that include directivity data (directivity information) for sound sources can be used for 6DoF rendering of audio content. In some of these audio formats the directivity data is discrete directivity data that is stored (e.g., in the SOFA format) as a set of discrete vectors consisting of direction (e.g., azimuth, elevation) and magnitude (e.g., gain). Direct application of such conventional discrete directivity representations for 6DoF rendering however has turned out to be sub-optimal, as noted above. In particular, for conventional discrete directivity representations the vector directions are typically significantly non-equidistantly spaced in 3D space, which necessitates interpolation between vector directions at the time of rendering (e.g., 6DoF rendering). Further, the directivity data contains redundancy and irrelevance, which results in a large bitstream size for encoding the representation.

Figure 1A:
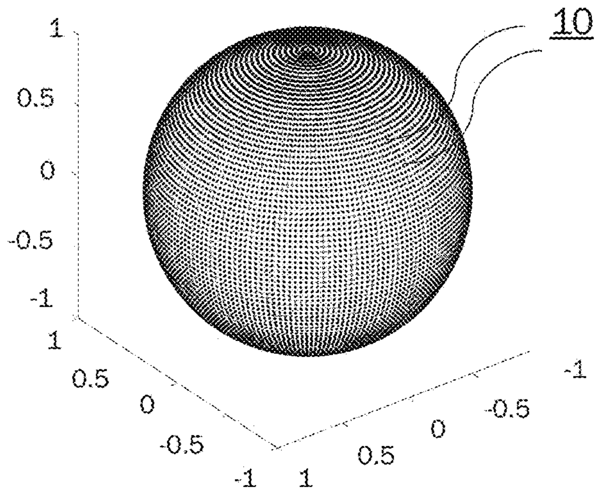
Figure 1B:
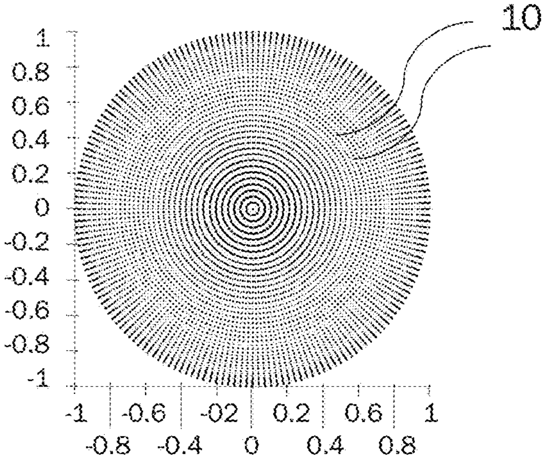
Figure 1C:
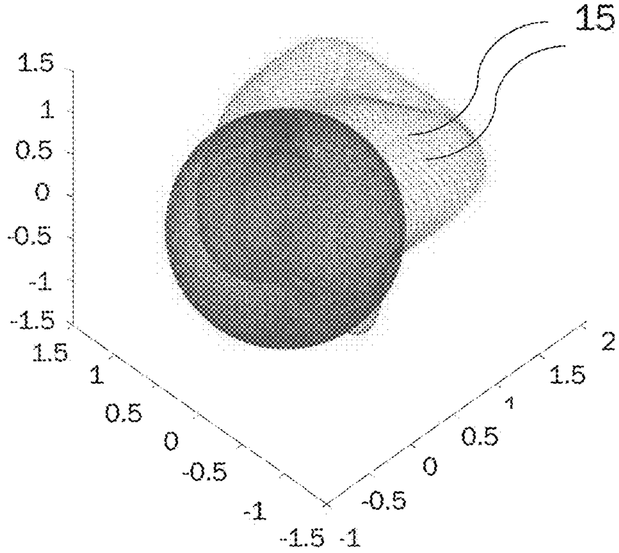

An example of a conventional representation of discrete directivity information of a sound source is schematically illustrated in FIG. 1A, FIG. 1B, and FIG. 1C. The conventional representation includes a plurality of discrete directivity unit vectors 10 and associated directivity gains 15. FIG. 1A shows a 3D view of the directivity unit vectors 10 arranged on a surface of a 3D sphere. In the present example, these directivity unit vectors 10 are uniformly (i.e., equidistantly) arranged in the azimuth-elevation plane, which results in a non-uniform spherical arrangement on the surface of the 3D sphere. This can be seen in FIG. 1B, which shows a top view of the 3D sphere on which the directivity unit vectors 10 are arranged.

FIG. 1C finally shows the directivity gains 15 for the directivity unit vectors 10, thereby giving an indication of the radiation pattern (or "directivity") of the sound source.

Improvements of the representation of discrete directivity information can be achieved because directions can be calculated at the decoder side (e.g., via equations, tables or other precomputed look up information), and that conventional representations may involve unnecessarily fine-grained sampling of directions from the perspective of psychoacoustics.

Figure 2:
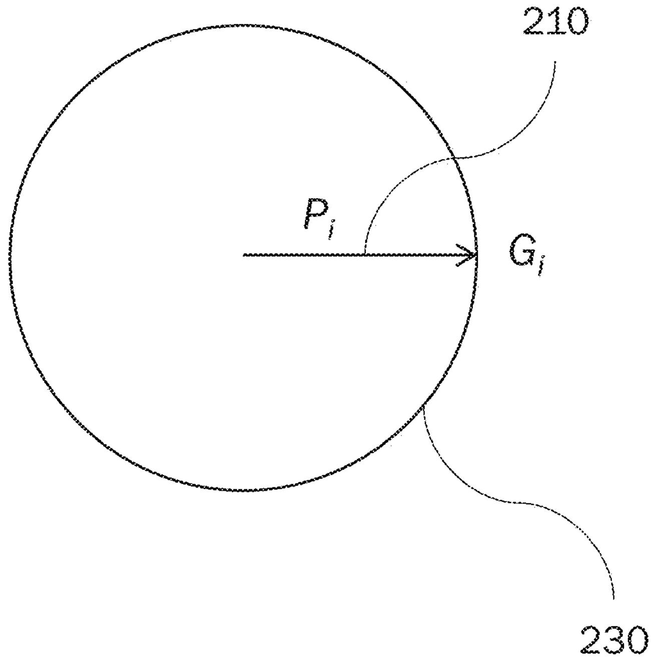

The present disclosure assumes an initial (e.g., conventional) representation of discrete directivity information for a sound source (acoustic source) including a set of M discrete acoustic source directivity gains $G_i$. The data $G_i$ is defined on the non-uniformly distributed directivity unit vectors $P_{i=1, \ldots, M}$, wherein each directivity unit vector $P_i$ has its associated directivity gain $G_i=G(P_i)$. The directivity unit vectors are unit-length directivity vectors. A directivity unit vector $P_i$, 210, and its associated directivity gain $G_i$ are schematically illustrated in FIG. 2. Therein, the directivity unit vector $P_i$ is arranged on the surface 230 of the 3D sphere, which is a unit sphere. The set of directivity unit vectors $P_i$ may be referred to as first set of first directivity unit vectors in the context of the present disclosure. The directivity gains $G_i$ may be referred to as first directivity gains associated with respective ones of the first directivity vectors.

As noted above, the non-uniform distribution of the directivity unit vectors $P_i$ requires interpolation of the directivity gains $G_i$ at the decoder side to achieve a 'uniform response' on the object-to-listener orientation change.

To address this issue, the present disclosure seeks to provide an optimized directivity representation $\hat{G}$ approximating the original data G in a way to produce an equivalent (e.g., subjectively non-distinguishable) 6DoF audio rendering output. Here, the directivity unit vectors $P_i$ and/or the directivity unit vectors $\hat{P}_i$ may be expressed in spherical or Cartesian coordinate systems, for example.

The optimized representation $\hat{G}$ shall be defined on semi-uniform distribution of the directivity vectors $\hat{P}_i$, result in a smaller bitstream size Bs, i.e., $Bs(\hat{G}) \ll Bs(G)$, and/or allows for computationally efficient decoding processing. In the context of the present disclosure, semi-uniform shall mean uniform up to a given (e.g., desired) representation accuracy.

For doing so, the present disclosure assumes that the object-to-listener orientation is arbitrary with a uniform probability distribution, and that the object-to-listener orientation representation accuracy (i.e., desired representation accuracy) is known and, for example, defined based on subjective directivity sensitivity thresholds of a human listener (e.g., reference human listener).

The present disclosure provides at least the following technical benefits. A first technical benefit relates to benefits from a parameterization of the directivity information utilizing uniform directionality representation in 3D space (not in the azimuth-elevation plane). The second technical benefit comes from the discarding of directivity information contained in the original data G that does not contribute to the directivity perception (i.e., that is below the orientation representation accuracy).

The uniform directionality representation is not trivial because the problem of uniform distribution of N directions in 3D space (e.g., equally spacing N points on a surface of a 3D unit sphere) is generally impossible to solve exactly for arbitrary numbers N>4, and because numerical approximation methods generating (semi-)equidistantly distributed points on the 3D unit sphere are often very complex (e.g. iterative, stochastic and computationally heavy).

The irrelevance and redundancy reduction in the original data G is also non-trivial since it is highly related to the definition of the orientation representation accuracy based on psychoacoustical considerations.

Based at least these technical benefits, the present disclosure proposes an efficient method of approximation of the uniform directivity representation that allows to avoid interpolation of the directivity gains at the decoder side and achieve a significant bitrate reduction without degradation in the resulting psychoacoustical directivity perception of the 6DoF rendered output.

Figure 9:
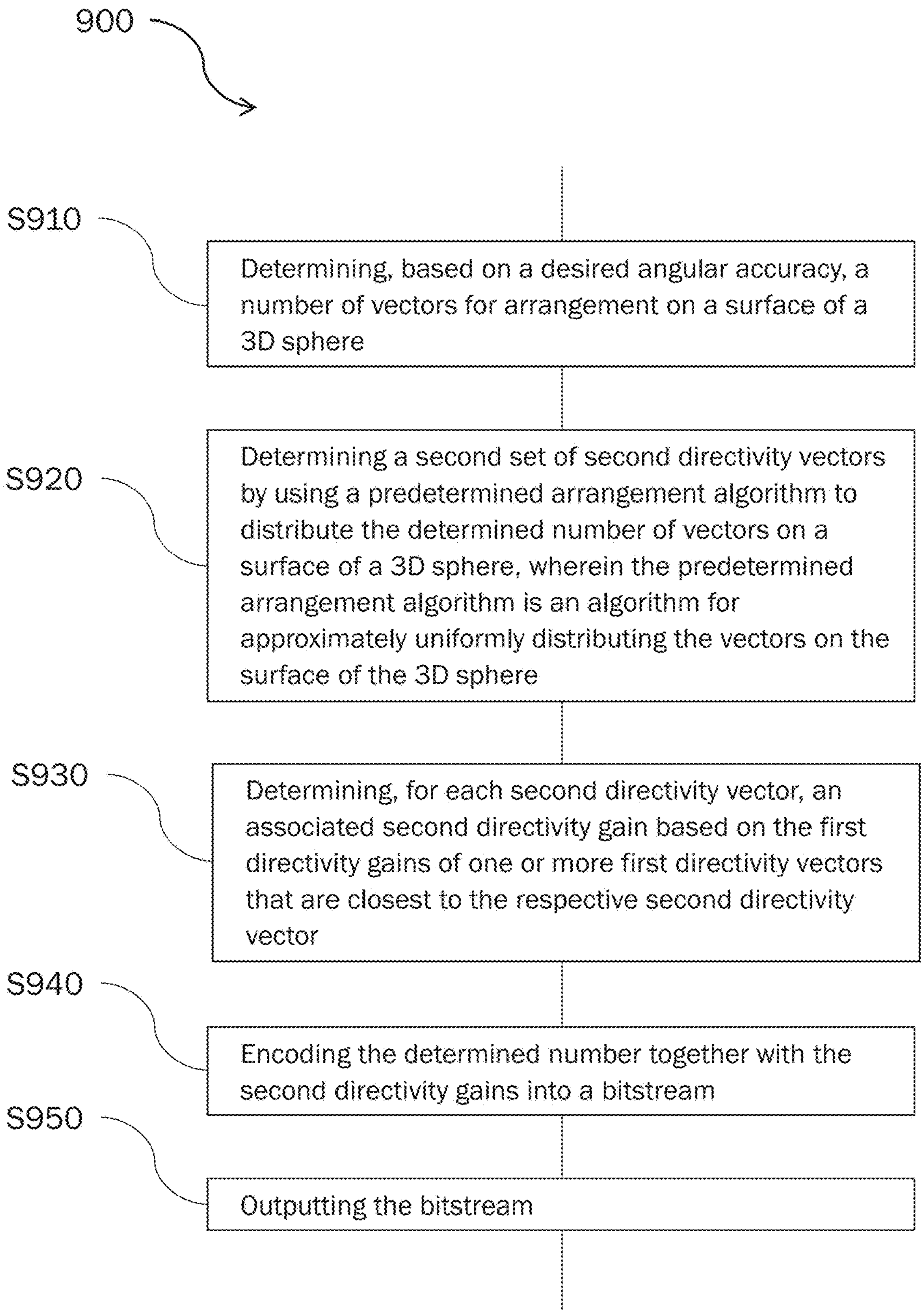

An example of a method 900 of processing (or encoding) audio content including (discrete) directivity information for at least one sound source (e.g., audio object) according to embodiments of the disclosure is illustrated in flowchart form in FIG. 9. The directivity information is assumed to relate to the directivity information G defined above, i.e., comprises a first set of first directivity unit vectors representing directivity directions and associated first directivity gains. The directivity information G may be included in the audio content as part of metadata for the sound source (e.g., audio object).

As an initial step (not shown in the flowchart), the method 900 may obtain the audio content. The directivity information represented by the first set of first directivity vectors and associated first directivity gains may be stored in the SOFA format.

At step S910, a number N of unit vectors for arrangement on a surface of a 3D sphere is determined (e.g., calculated) as a count number, based on a desired representation accuracy D. This may relate to a determination (e.g., based on a calculation) of the number N of (semi-)equidistantly distributed directions or (directivity) unit vectors (e.g., based on a given orientation representation accuracy D). Here, semi-equidistantly distributed is understood to mean equidistantly distributed up to the representation accuracy D. The representation accuracy D may correspond to an angular accuracy or directional accuracy, for example. In this sense, the representation accuracy may correspond to an angular resolution. In some implementations, the desired representation accuracy may be determined based on a model of perceptual directivity thresholds of a human listener (e.g., reference human listener).

Notably, the output of this step is a single integer, i.e., the number N of directivity unit vectors. The generation of actual directivity unit vectors will be performed at step S920 described below. Put differently, step S910 determines the cardinality of a set of directivity unit vectors to be generated. The number N of unit vectors may be determined such that, when N unit vectors were (semi-) equidistantly distributed on a surface of a 3D (unit) sphere, for example by a predetermined arrangement algorithm, they would approximate the directions indicated by the first set of first directivity vectors up to the desired representation accuracy D. Accordingly, the predetermined arrangement algorithm may be an algorithm for approximately uniform spherical distribution (e.g., up to the representation accuracy) of the unit vectors on the surface of the 3D sphere. An example of such arrangement algorithm will be described below. In other words, the number N of unit vectors may be determined such that when the unit vectors were distributed on the surface of the 3D sphere by the predetermined arrangement algorithm, there would be, for each of the first directivity unit vectors in the first set, at least one among the unit vectors whose direction difference with respect to the respective first directivity unit vector is smaller than the desired representation accuracy D. The number N may serve as a scaler (i.e., control parameter) for the predetermined arrangement algorithm, i.e., the predetermined arrangement algorithm may be suitable for arranging any number of unit vectors on the surface of the 3D sphere.

In the above, the direction difference may be an angular distance (e.g., angle), for example. The direction difference may be defined in terms of a suitable direction difference norm (e.g., a direction difference norm depending on the scalar product of the directivity unit vectors involved).

At step S920, a second set of second directivity unit vectors is generated by using the predetermined arrangement algorithm for distributing the determined number N of unit vectors on the surface of the 3D sphere. As noted above, the predetermined arrangement algorithm is an algorithm for approximately uniform spherical distribution of the unit vectors on the surface of the 3D sphere. The second directivity unit vectors may correspond to the directivity unit vectors $\hat{P}_{i=1, \ldots, N}$ defined above. Accordingly, this step may relate to determining (e.g., based on a calculation) the directivity vectors $P_{i=1, \ldots, N}$ using the predetermined arrangement algorithm controlled by the scaler N. Preferably, the cardinality of the second set of second directivity unit vectors is smaller than the cardinality of the first set of first directivity unit vectors. This assumes that the desired representation accuracy D is smaller than the representation accuracy provided for by the first set of first directivity unit vectors.

At step S930, associated second directivity gains are determined (e.g., calculated) for the second directivity unit vectors, based on the first directivity gains. For example, the determination may be based, for a second directivity unit vector, on the first directivity gains of one or more among a group of first directivity unit vectors that are closest to the second directivity unit vector. For example, this determination may involve stereographic projection or triangulation. In a particularly simple implementation, the second directivity gain for a given second directivity unit vector is set to the first directivity gain associated with that first directivity unit vector that is closest to the given second directivity vector (i.e., that has the smallest directional distance to the given second directivity vector). In general, this step may relate to finding the directivity approximation $\hat{G}$ defined on $\hat{P}_i$ of the original data G defined on $P_i$. The directivity information represented by the second set of second directivity vectors and associated second directivity gains may be present (e.g., stored) in the SOFA format.

If the method 900 is a method of encoding, it further comprises steps S940 and S950 described below. In this case, method 900 may be performed at an encoder.

At step S940, the determined number N of unit vectors is encoded with the second directivity gains into a bitstream. This may relate to encoding the bitstream containing the data G and the number N. The directivity information represented by the second set of second directivity vectors and associated second directivity gains may be present (e.g., stored) in the SOFA format.

At step S950, the bitstream is output. For example, the bitstream may be output for transmission to a decoder or for being stored on a suitable storage medium.

Figure 10:
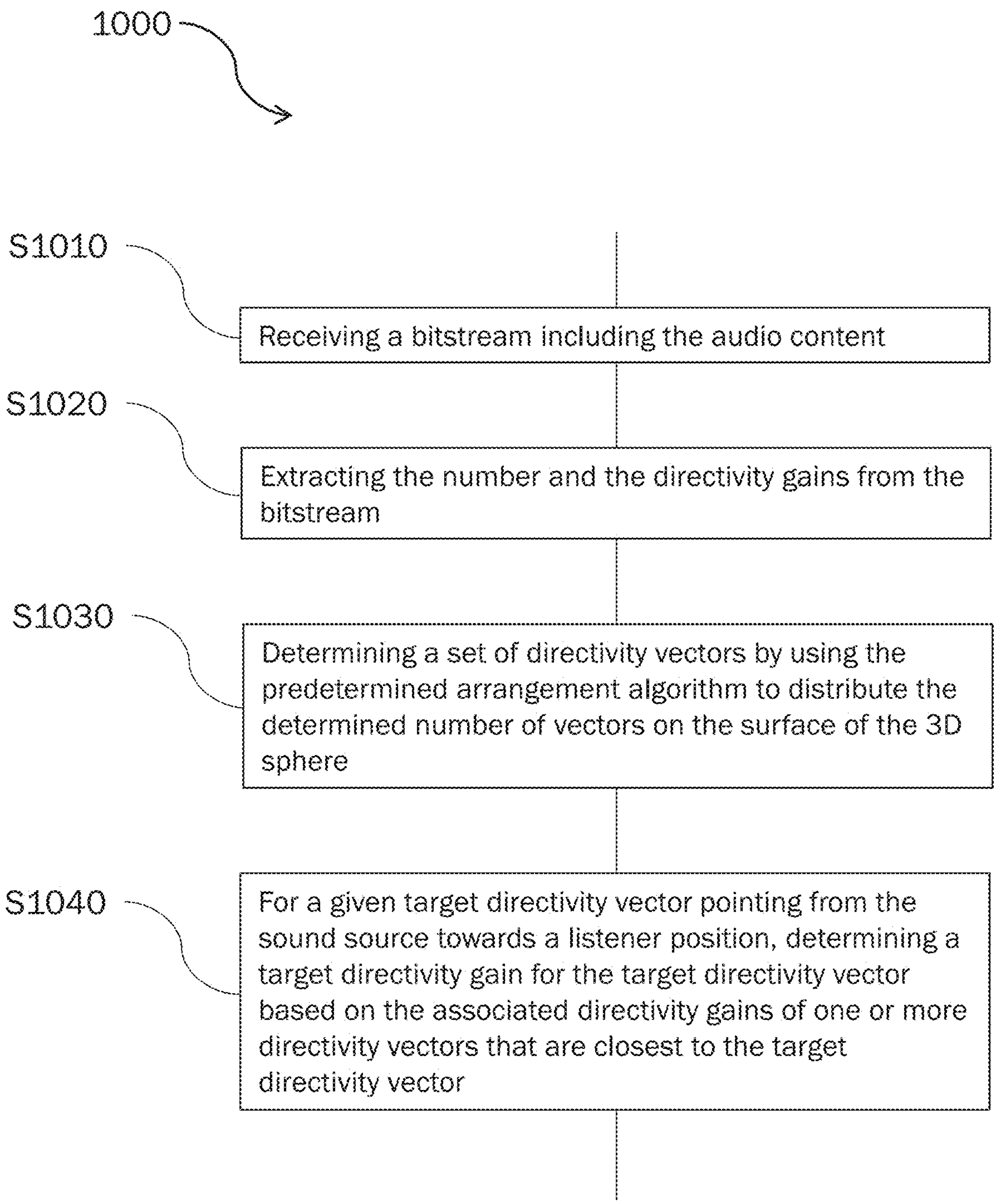

An example of a method 1000 of decoding audio content including (discrete) directivity information for at least one sound source (e.g., audio object) according to embodiments of the disclosure is illustrated in flowchart form in FIG. 10. Method 1000 may be performed at a decoder. The audio content may be encoded in a bitstream by steps S910 to S950 of method 900 described above, for example. As such, the directivity information may comprise (a representation of) the number N that indicates a number of approximately uniformly distributed unit vectors on the surface of the 3D sphere, and, for each such unit vector, an associated directivity gain. The associated directivity gains may be the second directivity gains (data $\hat{G}=\{G_i\}_{i=1, \ldots, N}$) defined above. The unit vectors may be assumed to be distributed on the surface of the 3D sphere by a predetermined arrangement algorithm (e.g., the same predetermined arrangement algorithm as used for processing/encoding the audio content), wherein the predetermined arrangement algorithm is an algorithm for approximately uniform spherical distribution of the unit vectors on the surface of the 3D sphere.

At step S1010, the bitstream including the audio content is received.

At step S1020, the number N and the directivity gains are extracted from the bitstream (e.g., by a demultiplexer). This step may relate to decode the bitstream containing the data G and the number N to obtain the data G and the number N.

At step S1030, a set of directivity unit vectors is determined (e.g., generated) by using the predetermined arrangement algorithm to distribute the number N of unit vectors on the surface of the 3D sphere. This step may proceed in the same manner as step S920 described above. Each directivity unit vector determined at this step has its associated directivity gain among the directivity gains extracted from the bitstream at step S1020. Assuming that the same predetermined arrangement algorithm is used in processing/encoding the audio content and in decoding the audio content, the directivity unit vectors generated at step S1030 is determined in the same order as the second directivity unit vectors generated at step S920.

Then, encoding the second directivity gains into the bitstream as an ordered set at step S940 allows for an unambiguous assignment, at step S1030, of directivity gains to respective ones among the generated directivity unit vectors.

At step S1040, for a given target directivity unit vector pointing from the sound source towards a listener position, a target directivity gain is determined (e.g., calculated) for the target directivity unit vector based on the associated directivity gains of the directivity unit vectors. For example, the target directivity gain may be determined (e.g., calculated) based on the associated directivity gains of one or more among a group of directivity unit vectors that are closest to the target directivity unit vector.

For example, this determination may involve stereographic projection or triangulation. In a particularly simple implementation, the target directivity gain for the target directivity unit vector is set to the directivity gain associated with that directivity unit vector that is closest to the target directivity vector (i.e., that has the smallest directional distance to the target directivity vector). In general, this step may relate to using $\hat{G}$ defined on $\hat{P}_i$ for audio directivity modeling.

Alternatively, the steps outlined above can be distributed differently between the encoder side and the decoder side. For instance, if there are circumstances that an encoder cannot perform the operations of method 900 listed above (e.g., if the accuracy (representation accuracy) of the proposed approximation can only be defined on the decoder side), the necessary steps can be performed at the decoder side only, which would in turn not result in a smaller bitstream size, but still have the benefit of saving computational complexity at the decoder side for rendering.

Figure 11:
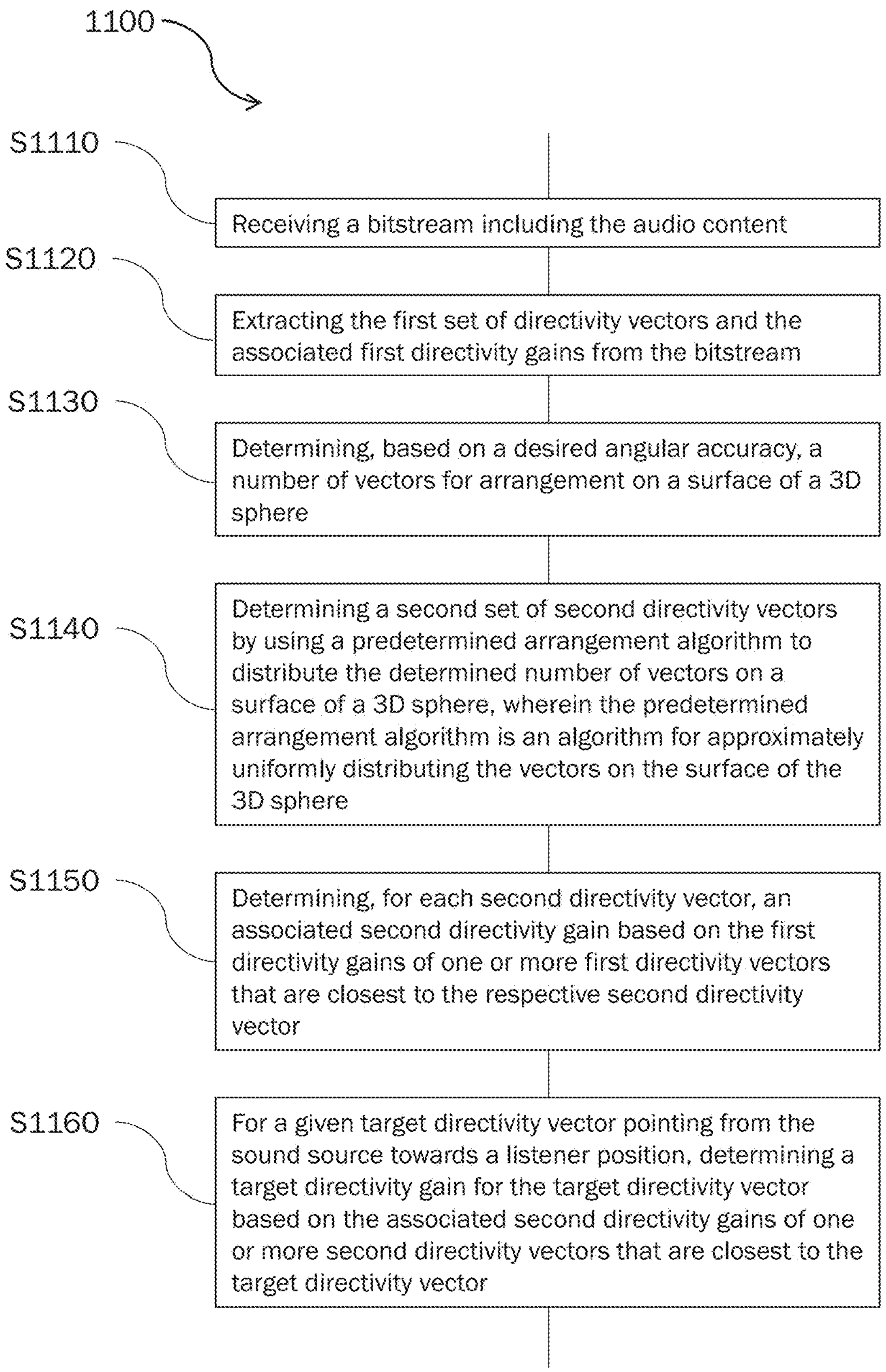

A corresponding example of a method 1100 of decoding audio content including (discrete) directivity information for at least one sound source (e.g., audio object) according to embodiments of the disclosure is illustrated in flowchart form in FIG. 11. The directivity information is assumed to relate to the directivity information G defined above, i.e., comprises a first set of first directivity unit vectors representing directivity directions and associated first directivity gains. In this sense, contrary to method 1000, the method 1100 receives audio content as input for which the directivity information has not yet been optimized by methods according to the present disclosure. The directivity information G may be included in the audio content as part of metadata for the sound source (e.g., audio object).

At step S1110, a bitstream including the audio content is received. Alternatively, the audio content may be obtained by any other feasible means, depending on the use case.

At step S1120, the first set of directivity unit vectors and the associated first directivity gains are extracted from the bitstream (or obtained by any other feasible means, depending on the use case). In one example, the directivity vectors and associated first directivity gains may be de-multiplexed from a bit stream.

At step S1130, a number of vectors for arrangement on a surface of a 3D sphere is determined, as a count number, based on a desired representation accuracy. This step may proceed in the same manner as step S910 described above.

At step S1140, a second set of second directivity unit vectors is generated by using a predetermined arrangement algorithm to distribute the determined number of unit vectors on the surface of the 3D sphere. The predetermined arrangement algorithm is an algorithm for approximately uniform spherical distribution of the unit vectors on the surface of the 3D sphere. This step may proceed in the same manner as step S920 described above.

At step S1150, associated second directivity gains are determined for the second directivity unit vectors based on the first directivity gains. For example, the associated second directivity gains may be determined for the second directivity unit vectors based on the first directivity gains of one or more among a group of first directivity unit vectors that are closest to the respective second directivity unit vector. Thus step may proceed in the same manner as step S930 described above.

At step S1160, for a given target directivity unit vector pointing from the sound source towards a listener position, a target directivity gain is determined for the target directivity unit vector based on the second directivity gains. For example, the target directivity gain may be determined for the target directivity unit vector based on the associated second directivity gains of one or more among a group of second directivity unit vectors that are closest to the target directivity unit vector. This step may proceed in the same manner as step S1040 described above.

In a particularly simple implementation, the target directivity gain for the target directivity unit vector is set to the second directivity gain associated with that second directivity unit vector that is closest to the target directivity vector (i.e., that has the smallest directional distance to the target directivity vector).

Since there may be flexibility in which steps are performed at the encoder side and the decoder side, it is further suggested to signal to the decoder which steps it has to perform (or, in other words, which format the directivity data has). This could be easily done with one bit of information, for example using the bitstream syntax for the directivity representation signaling shown in Table 1 below. Examples of possible bitstream variable semantics for the directivity representation signaling are shown in Table 2 below.

TABLE 1

| Syntax | No. of bits |
|---|---|
| directivity_config( ) | 1 |
| {... | |
| directivity_type | |
| ...} | |

TABLE 2

| | |
|---|---|
| directivity_type | This field shall be used to identify the type of the directivity data, which can be:<br>0 - directivity data is coded according to the current invention<br>Decoders shall only perform the steps S1020 to S1040 (as listed above)<br>1 - directivity data is not coded according to the current invention<br>Decoders shall perform the steps S1120 to S1160 (as listed above) |

In accordance with the above, a method of decoding audio content according to embodiments of the present disclosure may comprise extracting an indication from the bitstream of whether the second set of directivity unit vectors should be generated. Further, the method may comprise determining the number of unit vectors and generating the second set of second directivity unit vectors (only) if the indication indicates that the second set of directivity unit vectors should be generated. This indication may be a 1-bit flag, e.g., the directivity_type parameter defined above.

Using methods according to the present disclosure, a representation of the discrete directivity data can be generated that requires no interpolation at the time of 6DoF rendering to provide a 'uniform response' on the object-to-listener orientation change. Moreover, a low bitrate for transmitting the representation can be achieved, since the perceptually relevant directivity unit vectors $\hat{P}_i$ are not stored, but calculated.

Figure 7A:
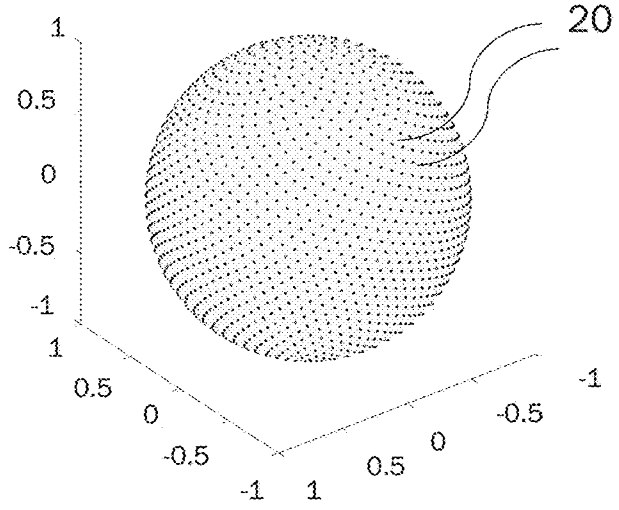
Figure 7B:
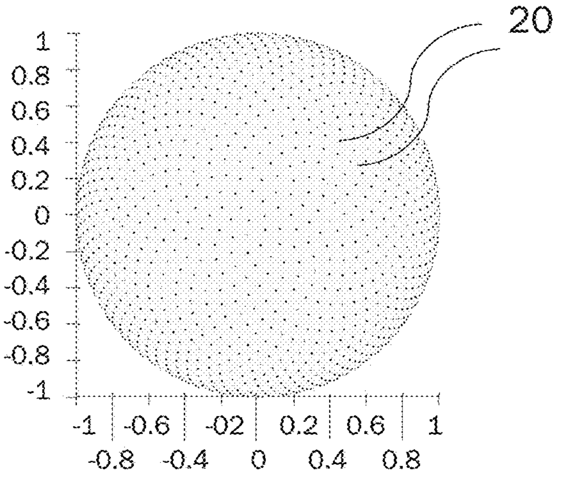
Figure 7C:
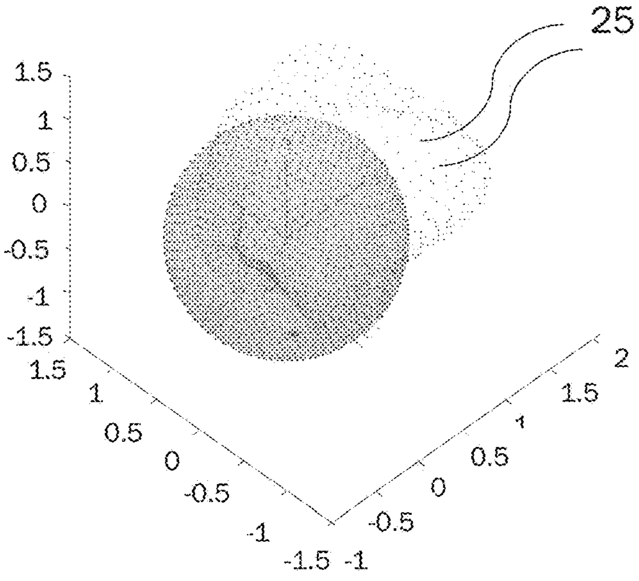

An example of a representation of discrete directivity data of a sound source that is achievable by means of methods according to the present disclosure is schematically illustrated in FIG. 7A, FIG. 7B, and FIG. 7C. This representation is to be compared to the representation schematically illustrated in FIG. 1A, FIG. 1B, and FIG. 1C. FIG. 7A shows a 3D view of the (second) directivity unit vectors $\hat{P}_i$, 20, arranged on the surface of the 3D sphere. These directivity unit vectors 20 are spatially uniformly distributed on the surface of the 3D sphere, which implies a non-uniform distribution in the azimuth-elevation plane. This can be seen in FIG. 7B, which shows a top view of the 3D sphere on which the directivity unit vectors 20 are arranged. FIG. 7C finally shows the (second) directivity gains 25 for the (second) directivity unit vectors 20, thereby giving an indication of the radiation pattern (or "directivity") of the sound source. The envelope of this pattern is substantially identical to the envelope of the pattern shown in FIG. 1C and contains the same amount of relevant psychoacoustic information.

Figure 8A:
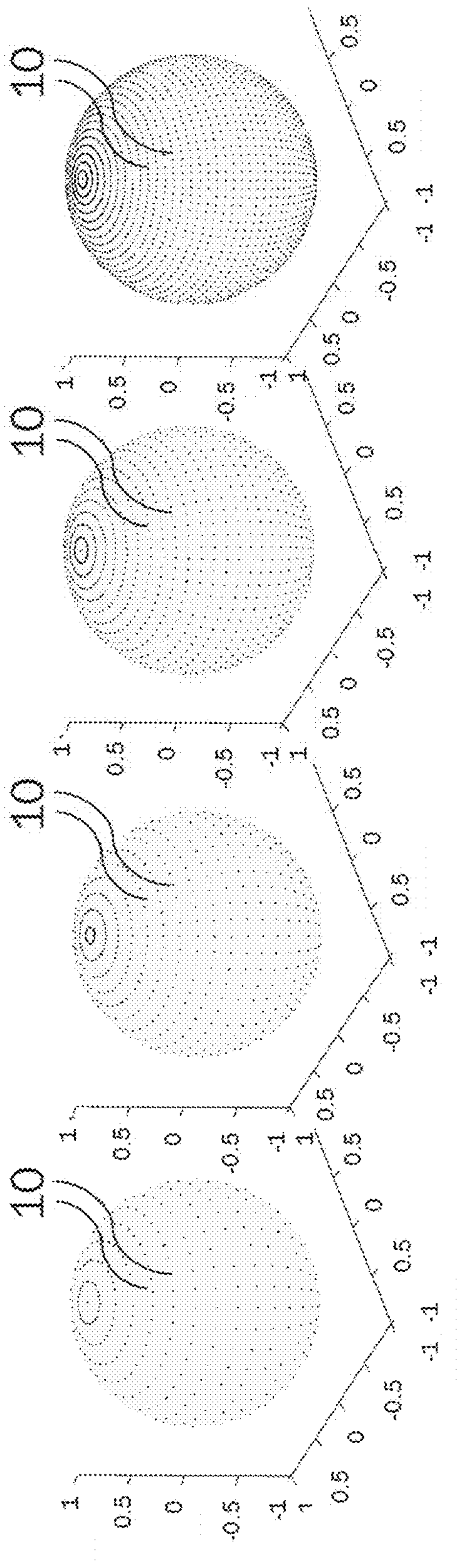
Figure 8B:
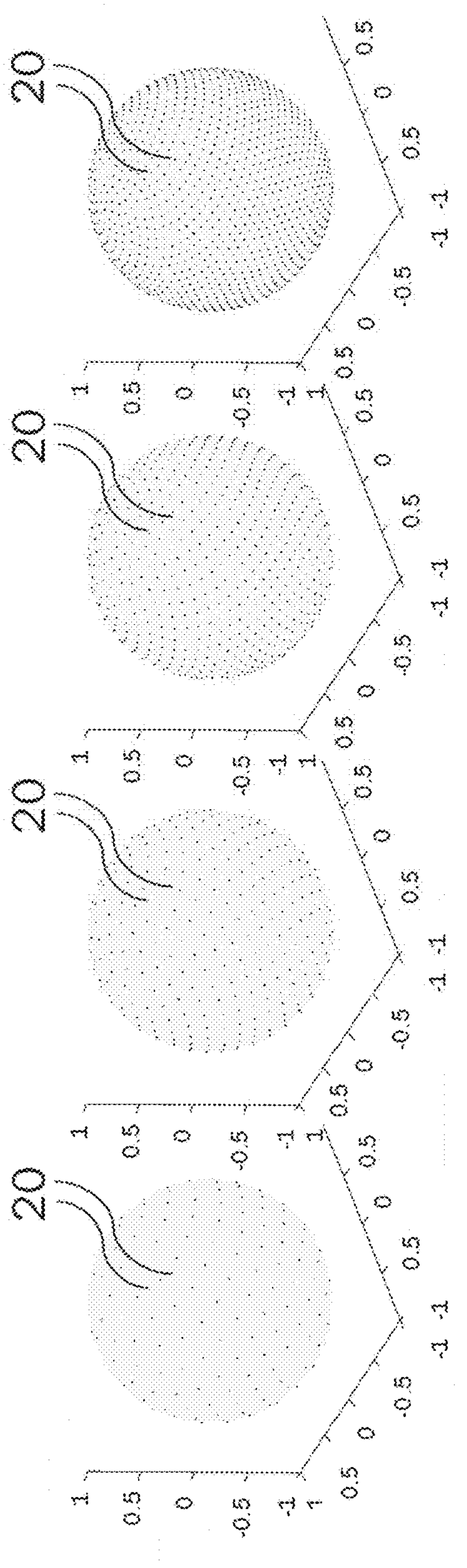

FIG. 8A and FIG. 8B show further examples comparing conventional representations of discrete directivity data of a sound source to representations according to embodiments of the present disclosure, for different numbers N of directivity unit vectors (and corresponding orientation representation accuracies D). FIG. 8A (upper row) illustrates conventional representations G and FIG. 8B (lower row) illustrates representations $\hat{G}$ according to embodiments of the present disclosure. The left-most panels relate to the case of $N=2^8$ and $D<6°$. The second panels from the left relate to the case of $N=2^9$ and $D<4°$. The third panels from the left relate to the case of $N=2^{10}$ and $D<3°$. The right-most panels relate to the case of $N=2^{11}$ and $D<2°$.

Specific implementation examples of the aforementioned method steps of methods according to embodiments of the present disclosure will be described next.

For these specific implementation examples, it is assumed that the original set of M discrete acoustic source directivity measurements (estimations) G is given by the following radiation pattern format:

$$G=G(P_k) \quad \text{[Eq. (1)]}$$

where $P_k=(\theta_i,\phi_j)$ are the discrete elevation angle $$\theta_i \in \left[-\frac{\pi}{2}, \frac{\pi}{2}\right]$$

and azimuth angle $\phi_i \in [0,2\pi)$ relative to the acoustic source, M is the total number of the angle pairs k=(i,j), k∈{1, . . . , M}. As noted above, the original set of M discrete acoustic source directivity measurements may correspond to the first set of first directivity unit vectors and associated first directivity gains.

With the above assumptions, step S920 of method 900 (or step S1140 of method 1100) may proceed as follows.

In order to calculate (i.e., generate) N directivity vectors $\hat{P}_{i=1, \ldots, N}$ approximating uniform directionality distribution in 3D space (i.e., positions on the 3D unit sphere) any appropriate numerical approximation method (arrangement algorithm) can be used (see, e.g., D. P. Hardina, T. Michaelsab, E. B. Saff "A Comparison of Popular Point Configurations on $S^2$" (2016) Dolomites Research Notes on Approximation: Volume 9, Pages 16-49). Nevertheless, the present disclosure proposes, without intended limitation, to consider one particular approximation method (arrangement algorithm) based on Kogan, Jonathan "A New Computationally Efficient Method for Spacing n Points on a Sphere" (2017) Rose-Hulman Undergraduate Mathematics Journal: Volume 18, Issue 2, Article 5. Reasons for this choice include the method's low computational complexity and its dependence on a single control parameter N, as well as absences of restrictions on it (for N≥2).

The following equation (e.g., solved at the encoder and decoder) defines $P_i$ and avoid its explicit storage of $\hat{P}_i$ in the bitstream:

$$P_i=(a_i,b_i): a_i=s_i*(0.1+1.2*N), b_i=\pi*0.5*\text{sign}(s_i)*(1-\sqrt{1-|s_i|}) \quad \text{[Eq. (2)]}$$

where the coordinates $a_i$, $b_i$ are calculated for each parameter $s_i$ defined as:

$$s_i=\{\text{start}+\text{step}*i\}, i=1, \ldots, N \quad \text{[Eq. (3)]}$$

and where the start and step parameters are obtained as:

$$\text{start}=r-1, \text{step}=-2*r*\text{start}, r=(N-1)^{-1} \quad \text{[Eq. (4)]}$$

In more general terms, the predetermined arrangement algorithm may involve superimposing a spiraling path on the surface of the 3D sphere. The spiraling path extends from a first point on the sphere (e.g., one of the poles) to a second point on the sphere (e.g., the other one of the poles), opposite the first point. Then, the predetermined arrangement algorithm may successively arrange the unit vectors along the spiraling path. The spacing of the spiraling path and the offsets (e.g., step) between respective two adjacent unit vectors along the spiraling path may be determined based on the number N of unit vectors.

The following example of a MatLab function can be used to generate the directivity vectors $\hat{P}_i$:

```
function [a, b] = get_P_hat (N)
  R = 1/ (N−1);
  start = R−1;
  step = −2*R*start;
  for j = 1:N
    s = start+ (j−1) *step;
    a (j) = s* (0.1+1.2*N) ;
    b (j) = pi*0.5*sign(s) * (1−sqrt (1−abs (s) ) ) ;
  end
```

The following example of a MatLab script can be used to represent vectors $\hat{P}_i$ in Cartesian coordinate system:

```
function [x, y, z]=get_P_hat_in_Cartesian_coordinate_system(N)
  [a, b]=get_P_hat(N);
  X=cos(a).*cos(b);
  y=sin(a).*cos(b);
  z=sin(b);
```

With the above assumptions, step S910 of method 900 (or step S1130 of method 1100) may proceed as follows.

In order to calculate the directivity vectors $\hat{P}_i$ the control parameter N has to be specified based on the orientation representation accuracy value D defined as:

$$\forall P, \exists k: \|P-\hat{P}_k\| \leq D \quad \text{[Eq. (5)]}$$

In plain language, for any (∀) direction P there exists at least one (∃) index k such that the corresponding direction $\hat{P}_k$ (defined by the method of, e.g., step S920) differs from P by the value smaller or equal to the orientation representation accuracy D.

Figure 3:
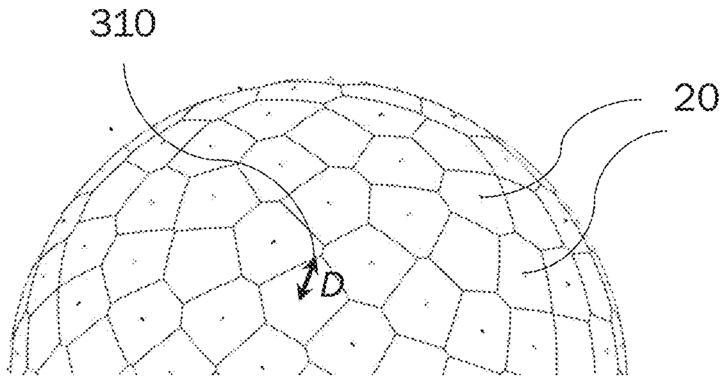

This is schematically illustrated in FIG. 3 in which the maximum distance 310 from a closest one of the directivity unit vectors $\hat{P}_i$, 20, is smaller than the desired representation accuracy D. This can be realized by ensuring, assuming that the surface of the 3D sphere is subdivided into a plurality of cells around respective directivity unit vectors $\hat{P}_i$, with each cell including all those directions that are closer to the directivity unit vector $\hat{P}_i$ of that cell than to any other directivity unit vector $\hat{P}_i$, that the direction difference of any direction on a cell boundary to the closest directivity unit vector $\hat{P}_i$ is not greater than the desired representation accuracy D.

Figure 4:
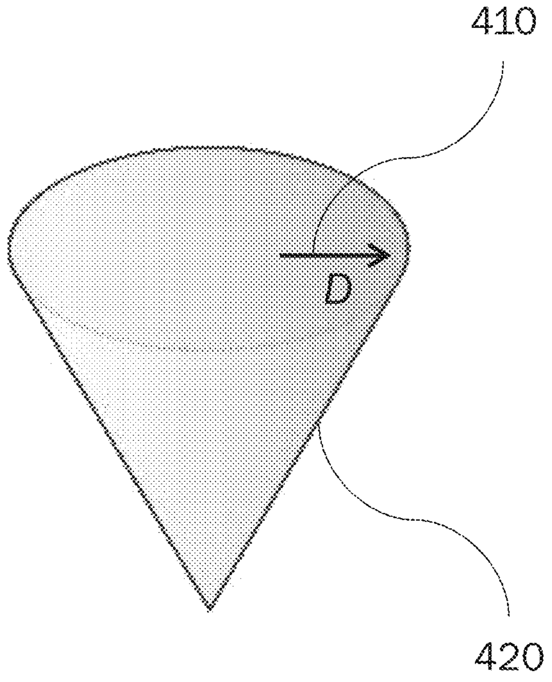

Accordingly, the representation accuracy (orientation representation accuracy) value D represents the worst case scenario schematically illustrated in FIG. 4: the sound radiation pattern G is defined to have a non-zero value for one single direction $P_1$, for all other directions it is zero: $G(P_{i\neq 1})=0$. In this case, the directivity radiation pattern $\hat{G}$ having the orientation representation accuracy D (e.g., expressed in degrees) represents a cone 420 with the radius D, 410.

In some implementations, determining the number N of unit vectors may involve using a pre-established functional relationship between representation accuracies D and corresponding numbers N of unit vectors that are distributed on the surface of the 3D sphere by the predetermined arrangement algorithm and that approximate the directions indicated by the first set of first directivity unit vectors (e.g., $P_i$) up to the respective representation accuracy D.

Figure 5:
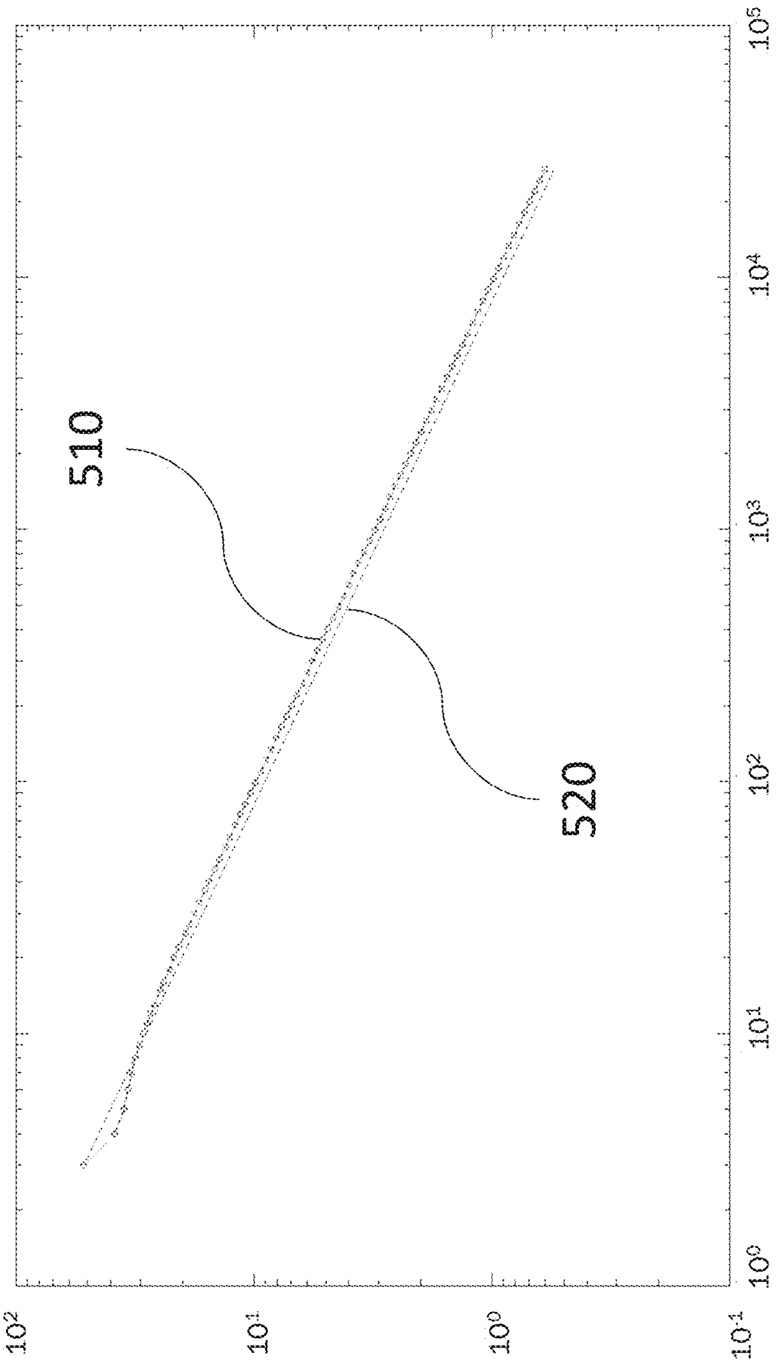
FIG. 5 is a graph schematically illustrating a relationship between a number of unit vectors and a resulting representation accuracy, assuming a given arrangement algorithm for arrangement of the unit vectors on the surface of the 3D sphere.

Such functional relationship can be obtained for example by a brute force approach of repeatedly distributing different numbers N of directivity unit vectors on the surface and determining the resulting representation accuracy, e.g., in the manner illustrated with reference to FIG. 3. For the arrangement algorithm described above with reference to Eq. (2) to Eq (4), the relationship between D and N illustrated in the graph of FIG. 5 (circular markers 510) is obtained. This relationship can be approximated (continuous line 520 in FIG. 5) using the linear function $$\ln(N)=9-2*\ln(D) \quad \text{[Eq (6)]}$$

Figure 6:
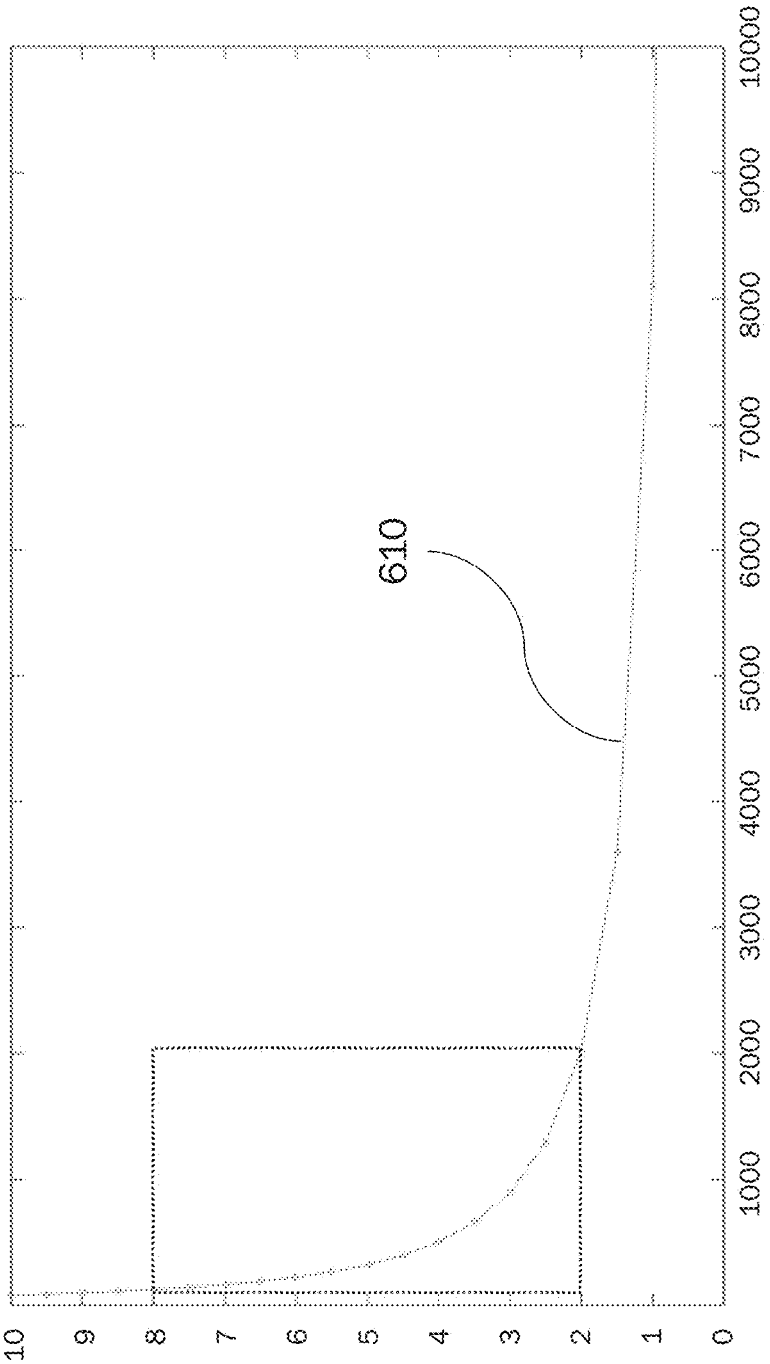
FIG. 6 is a graph schematically illustrating a modeled relationship between the number of unit vectors and the resulting representation accuracy, assuming the given arrangement algorithm for arrangement of the unit vectors on the surface of the 3D sphere, FIG. 7A, FIG. 7B, and FIG. 7C schematically illustrate examples of a representation of directivity information including discrete directivity unit vectors and associated directivity gains according to embodiments of the disclosure, FIG. 8A schematically illustrates conventional representations of discrete directivity information for different representation accuracies, FIG. 8B schematically illustrates representations of discrete directivity information for different representation accuracies according to embodiments of the disclosure, FIG. 9 schematically illustrates, in flowchart form, a method of processing or encoding audio content including directivity information for at least one sound source according to embodiments of the disclosure, FIG. 10 schematically illustrates, in flowchart form, an example of a method of decoding audio content including directivity information for at least one sound source according to embodiments of the disclosure, FIG. 11 schematically illustrates, in flowchart form, another example of a method of decoding audio content including directivity information for at least one sound source according to embodiments of the disclosure, FIG. 12 schematically illustrates an apparatus for processing or encoding audio content including directivity information for at least one sound source according to embodiments of the disclosure, and FIG. 13 schematically illustrates an apparatus for decoding audio content including directivity information for at least one sound source according to embodiments of the disclosure.

Therefore, in the present example, the minimal required number N of semi-equidistantly distributed points N on the unit sphere to achieve a desired directivity representation accuracy D can be calculated by the functional relationship N=N(D) as:

$$N=\text{INTEGER}(e^{(9-2*\ln(D))}) \quad \text{[Eq. (7)]}$$

where INTEGER indicates an appropriate mapping procedure to an adjacent integer. This method has efficiency range for N<~2000 and the resulting orientation representation accuracy D correspond to the subjective directivity sensitivity threshold of ~2°. FIG. 6 illustrates this relationship 610 on the log-log scale. The dashed rectangle in this graph illustrates the efficiency range for N<~2000. The modeled relationship between the number N of unit vectors and the representation accuracy D is also illustrated for selected values in Table 3 below.

TABLE 3

| | | | | | | | | | | | | | | | | | | | | |
|---|---|---|---|---|---|---|---|---|---|---|---|---|---|---|---|---|---|---|---|---|
| N | 32412 | 8103 | 3601 | 2026 | 1296 | 900 | 661 | 506 | 400 | 324 | 268 | 225 | 192 | 165 | 144 | 127 | 112 | 100 | 90 | 81 |
| D | 0.5° | 1° | 1.5° | 2° | 2.5° | 3° | 3.5° | 4° | 4.5° | 5° | 5.5° | 6° | 6.5° | 7° | 7.5° | 8° | 8.5° | 9° | 9.5° | 10° |

Step S930 of method 900 (or step S1150 of method 1100) may proceed as follows.

In order to obtain the directivity data approximation $\hat{G}$ defined on $\hat{P}_i$ (e.g., the associated second directivity gains) of the original data G defined on $P_i$ (e.g., the first set of first directivity unit vectors and associated first directivity gains) one can use any approximation (e.g. stereographic projection) method. If this operation is performed at the encoder side (e.g., in step S930 of method 900) the computational complexity does not play a major role.

On the other hand, a particularly simple procedure for determining the directivity data approximation $\hat{G}$ (e.g., the second directivity gains) is to pick, for each of the directivity unit vectors $\hat{P}_i$ (e.g., second directivity unit vectors), the directivity gain $G(P_i)$ (e.g., first directivity gain) of the directivity unit vector $P_i$ (e.g., first directivity unit vector) that has the smallest directional difference to the respective directivity unit vectors $\hat{P}_i$. Picking the "nearest neighbor" of the directivity unit vector $\hat{P}_i$ may proceed according to $$\hat{G}(\hat{P}_i)=G(P_j),\ \|\hat{P}_i-P_j\| \leq D \rightarrow \min \quad \text{[Eq. (8)]}$$

Bitstream encoding (e.g., at step S940 of method 900) and bitstream decoding (e.g., at step S1020 of method 1000) may proceed in line with the following considerations.

The generated bitstream must contain the coded scalar value N to control the directivity vector $\hat{P}_i$ generation process (e.g., at step S1030 of method 1000) and the corresponding set of the directivity gains $\hat{G}(\hat{P}_i)$.

There are two possible modes to transport the directivity data $\hat{G}$:

One possible mode (first mode) is to encode the complete set of directivity gains $\hat{G}(P_i)$, i=1, . . . , N. In this case the bitstream will include a complete array of N gain values $\hat{G}(\hat{P}_i)$ assigned to the corresponding directions $\hat{P}_i$, for example by their order in the bitstream.

Another possible mode (second mode) is to encode a partial subset into the bitstream, $\hat{G}(\hat{P}_i)$, $i=\{n_1, \ldots, n_{N_{subset}}\}$, $N_{subset} \ll N$. In this case the bitstream will only include an array of $N_{subset}$ gain values $\hat{G}(\hat{P}_i)$ assigned to the corresponding directions $\hat{P}_i$, indicated for example by explicit index i signaling in the bitstream (i.e., signaling of indices i in the subset).

The bitstream sizes Bs for both possible modes can be estimated as follows. For the first mode, the bitstream size Bs may be estimated as $$Bs=\lceil N\rceil+\lceil N*G\rceil \quad \text{[Eq. (9)]}$$

For the second mode, the bitstream size Bs may be estimated as $$Bs=\lceil N\rceil+\lceil N_{subset}*G\rceil+\lceil N*\text{bool}\rceil \quad \text{[Eq. (10)]}$$

where the operator ⌈x⌉ denotes the amount of memory needed to code the value x.

In order to achieve better bitstream coding efficiency for ⌈N*G⌉, in some implementations, one can use numerical approximation methods (e.g. curve fitting). One particular advantage of the present disclosure is the possibility to apply 1D approximation methods (since data G is defined and uniformly distributed on the 1D spiraling path $s_i$). The conventional representations of discrete directivity information using the directivity unit vectors uniformly distributed in the azimuth-elevation plane $(\theta_i,\phi_j)$ in this case would require application of 2D approximation methods and accounting for boundary conditions.

In order to achieve better bitstream coding efficiency for ⌈N⌉, in some implementations, determining the number N of unit vectors may involve mapping the number N of unit vectors to one of a set of predetermined numbers, for example by rounding to the closest one among the set of predetermined numbers. The predetermined numbers then can be signaled by a bitstream parameter (e.g., bitstream parameter directivity_precision) to the decoder. In this case, there may be agreement between the encoder side and the decoder side on a relationship between the values of the bitstream parameter and corresponding ones among the predetermined numbers. This agreement may be established by storing identical look-up tables at the encoder side and the decoder side, for example.

In other words, in order to achieve better bitstream coding efficiency, it may be recommendable to use pre-selected settings for N that results in the optimal binary representation (e.g., ⌈N⌉=2 bits) and accuracy D:

TABLE 4

| N | 256 | 512 | 1024 | 2048 |
|---|---|---|---|---|
| D | ~5.6° | ~3.9° | ~2.8° | ~1.9° |

An example for the bitstream syntax for the directivity size signaling shown in Table 5 below.

TABLE 5

| Syntax | No. of bits |
|---|---|
| directivity_config( )<br>{...<br>directivity_precision<br>...} | 2 |

An example of possible bitstream variable semantics for the directivity size signaling is shown in Table 6 below.

TABLE 6

| | |
|---|---|
| directivity_precision | This field shall be used to identify the number of the directivity vectors: $N=2^{(directivity\_precision\ +\ 8)}$ |

Audio directivity modeling (e.g., at step S1040 of method 1000 or step S1160 of method 1100) in 6DoF rendering may proceed as follows.

For each given object-to-listener relative direction P (target directivity vector), the index k corresponding to closest direction vector $\hat{P}_k$ is determined as $$k: \|P-\hat{P}_k\| \rightarrow \min \quad \text{[Eq. (11)]}$$

The, the corresponding directivity gain $\hat{G}(\hat{P}_k)$ is applied for this object signal for rendering the sound source to the listener position.

It is to be noted that the radiation pattern of the sound source has been assumed to be broadband, constant, and covering all of $S^2$ space for convenience of notation and presentations. However, the present disclosure is likewise applicable to spectral frequency dependent radiation patterns (e.g., by performing the proposed methods on a band-by-band basis). Moreover, the present disclosure is likewise applicable to time-dependent radiation patterns, and to radiation patterns involving arbitrary subsets of directions.

It should further be noted that the concepts and schemes that are described in the present disclosure may be specified in a frequency and time-variant manner, may be applied directly in spectral or time domain, may be defined either globally or in an object-dependent manner, may be hard-coded into the audio renderer or may be specified via a corresponding input interface.

The methods and systems described herein may be implemented as software, firmware and/or hardware. Certain components may be implemented as software running on a digital signal processor or microprocessor. Other components may be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described herein are portable electronic devices or other consumer equipment which are used to store and/or render audio signals.

Figure 12:
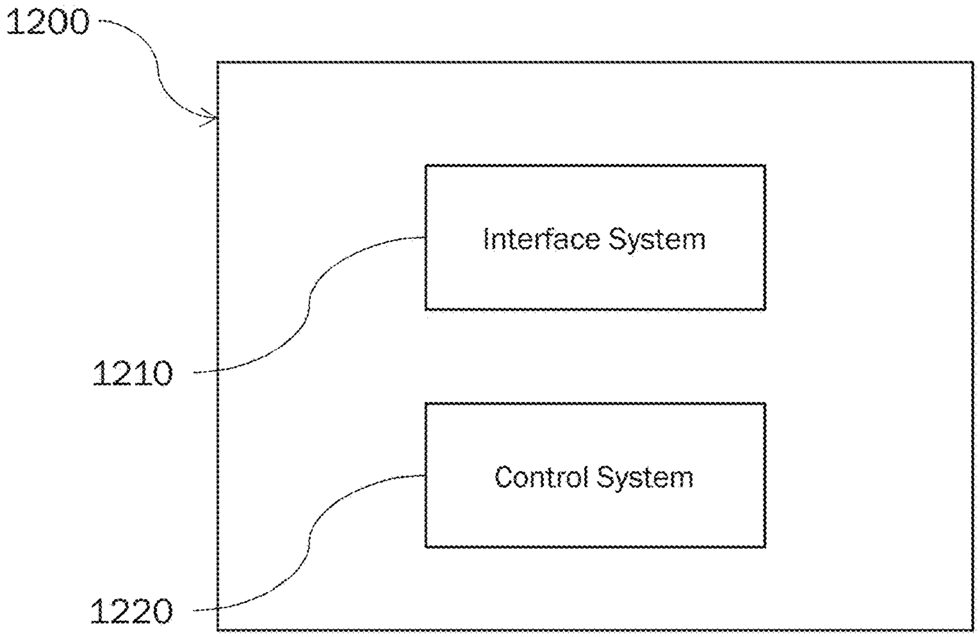

FIG. 12 schematically illustrates an example of an apparatus 1200 (e.g., encoder) for encoding audio content according to embodiments of the present disclosure. The apparatus 1200 may comprise an interface system 1210 and a control system 1220. The interface system 1210 may include one or more network interfaces, one or more interfaces between the control system and a memory system, one or more interfaces between the control system and another device and/or one or more external device interfaces. The control system 1220 may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. Accordingly, in some implementations the control system 1220 may include one or more processors and one or more non-transitory storage media operatively coupled to the one or more processors.

According to some such examples, the control system 1220 may be configured to receive, via the interface system 120, the audio content to be processed/encoded. The control system 1220 may be further configured to determine, as a count number, a number of unit vectors for arrangement on a surface of a 3D sphere, based on a desired representation accuracy (e.g., as in step S910 described above), to generate a second set of second directivity unit vectors by using a predetermined arrangement algorithm to distribute the determined number of unit vectors on the surface of the 3D sphere, wherein the predetermined arrangement algorithm is an algorithm for approximately uniform spherical distribution of the unit vectors on the surface of the 3D sphere (e.g., as in step S920 described above), to determine, for the second directivity unit vectors, associated second directivity gains based on the first directivity gains of one or more among a group of first directivity unit vectors that are closest to the respective second directivity unit vector (e.g., as in step S930 described above), and to encode the determined number together with the second directivity gains into a bitstream (e.g., as in step S940 described above). The control system 1220 may be further configured to output, via the interface system, to output the bitstream (e.g., as in step S950 described above).

Figure 13:
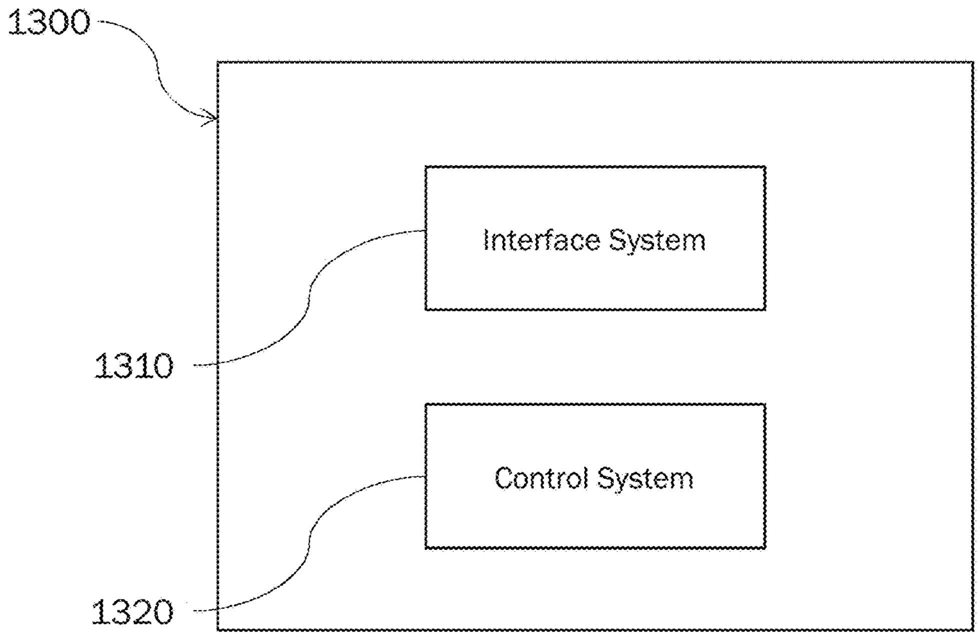

FIG. 13 schematically illustrates an example of an apparatus 1300 (e.g., decoder) for decoding audio content according to embodiments of the present disclosure. The apparatus 1300 may comprise an interface system 1310 and a control system 1320. The interface system 1310 may include one or more network interfaces, one or more interfaces between the control system and a memory system, one or more interfaces between the control system and another device and/or one or more external device interfaces. The control system 1320 may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. Accordingly, in some implementations the control system 1320 may include one or more processors and one or more non-transitory storage media operatively coupled to the one or more processors.

According to some such examples, the control system 1320 may be configured to receive, via the interface system 1310, a bitstream including the audio content. The control system 1320 may be further configured to extract the number and the directivity gains from the bitstream (e.g., as in step S1010 described above), to generate a set of directivity unit vectors by using the predetermined arrangement algorithm to distribute the number of unit vectors on the surface of the 3D sphere (e.g., as in step S1020 described above), and to determine, for a given target directivity unit vector pointing from the sound source towards a listener position, a target directivity gain for the target directivity unit vector based on the associated directivity gains of one or more among a group of directivity unit vectors that are closest to the target directivity unit vector (e.g., as in step S1030 described above).

Also, according to some such examples, the control system 1320 may be configured to receive, via the interface system 1310, a bitstream including the audio content (e.g., as in step S1110 described above). The control system 1320 may be further configured to extract the first set of directivity vectors and the associated first directivity gains from the bitstream (e.g., as in step S1120 described above), to determined, as a count number, a number of vectors for arrangement on a surface of a 3D sphere, based on a desired representation accuracy (e.g., as in step S1130 described above), to generate a second set of second directivity unit vectors by using a predetermined arrangement algorithm to distribute the determined number of unit vectors on the surface of the 3D sphere, wherein the predetermined arrangement algorithm is an algorithm for approximately uniform spherical distribution of the unit vectors on the surface of the 3D sphere (e.g., as in step S1140 described above), to determine, for the second directivity unit vectors, associated second directivity gains based on the first directivity gains of one or more among a group of first directivity unit vectors that are closest to the respective second directivity unit vector (e.g., as in step S1150 described above), and to determine, for a given target directivity unit vector pointing from the sound source towards a listener position, a target directivity gain for the target directivity unit vector based on the associated second directivity gains of one or more among a group of second directivity unit vectors that are closest to the target directivity unit vector (e.g., as in step S1160 described above).

In some examples, either or each of the above apparatus 1200 and 1300 may be implemented in a single device. However, in some implementations, the apparatus may be implemented in more than one device. In some such implementations, functionality of the control system may be included in more than one device. In some examples, the apparatus may be a component of another device.

Unless specifically stated otherwise, as apparent from the following discussions, it is appreciated that throughout the disclosure discussions utilizing terms such as "processing," "computing," "calculating," "determining", analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects of the present invention may be appreciated from the following enumerated example embodiments (EEEs):

1. A method of processing audio content including directivity information for at least one sound source, the directivity information comprising a first set of first directivity unit vectors representing directivity directions and associated first directivity gains, the method comprising:

determining, as a count number, a number of unit vectors for arrangement on a surface of a 3D sphere, wherein the number of unit vectors relates to a desired representation accuracy;

generating a second set of second directivity unit vectors by using a predetermined arrangement algorithm to distribute the determined number of unit vectors on the surface of the 3D sphere, wherein the predetermined arrangement algorithm is an algorithm for approximately uniform spherical distribution of the unit vectors on the surface of the 3D sphere; and determining, for the second directivity unit vectors, associated second directivity gains based on the first directivity gains of one or more among a group of first directivity unit vectors that are closest to the respective second directivity unit vector.

2. The method according to EEE 1, wherein the number of unit vectors is determined such that the unit vectors, when distributed on the surface of the 3D sphere by the predetermined arrangement algorithm, would approximate the directions indicated by the first set of first directivity unit vectors up to the desired representation accuracy.

3. The method according to EEE 1 or 2, wherein the number of unit vectors is determined such that when the unit vectors were distributed on the surface of the 3D sphere by the predetermined arrangement algorithm, there would be, for each of the first directivity unit vectors in the first set, at least one among the unit vectors whose direction difference with respect to the respective first directivity unit vector is smaller than the desired representation accuracy.

4. The method according to any one of the preceding EEEs, wherein determining the number of unit vectors involves using a pre-established functional relationship between representation accuracies and corresponding numbers of unit vectors that are distributed on the surface of the 3D sphere by the predetermined arrangement algorithm and that approximate the directions indicated by the first set of first directivity unit vectors up to the respective representation accuracy.

5. The method according to any one of the preceding EEEs, wherein determining the associated second directivity gain for a given second directivity unit vector involves:

setting the second directivity gain to the first directivity gain associated with that first directivity unit vector that is closest to the given second directivity unit vector.

6. The method according to any one of the preceding EEEs, wherein the predetermined arrangement algorithm involves superimposing a spiraling path on the surface of the 3D sphere, extending from a first point on the sphere to a second point on the sphere, opposite the first point, and successively arranging the unit vectors along the spiraling path, wherein the spacing of the spiraling path and the offsets between respective two adjacent unit vectors along the spiraling path are determined based on the number of unit vectors.

7. The method according to any one of the preceding EEEs, wherein determining the number of unit vectors further involves mapping the number of unit vectors to one of predetermined numbers, wherein the predetermined numbers can be signaled by a bitstream parameter.

8. The method according to any one of the preceding EEEs, wherein the desired representation accuracy is determined based on a model of perceptual directivity sensitivity thresholds of a human listener.

9. The method according to any one of the preceding EEEs, wherein the cardinality of the second set of second directivity unit vectors is smaller than the cardinality of the first set of first directivity unit vectors.

10. The method according to any one of the preceding EEEs, wherein the first and second directivity unit vectors are expressed in spherical or Cartesian coordinate systems.

11. The method according to any one of the preceding EEEs, wherein the directivity information represented by the first set of first directivity unit vectors and associated first directivity gains is stored in the SOFA format; and/or wherein the directivity information represented by the second set of first directivity unit vectors and associated second directivity gains is stored in the SOFA format.
12. The method according to any one of the preceding EEEs, wherein the method is a method of encoding the audio content and further comprises:
encoding the determined number of unit vectors together with the second directivity gains into a bitstream; and
outputting the bitstream.
13. A method of decoding audio content including directivity information for at least one sound source, the directivity information comprising a number that indicates a number of approximately uniformly distributed unit vectors on a surface of a 3D sphere, and, for each such unit vector, an associated directivity gain, wherein the unit vectors are assumed to be distributed on the surface of the 3D sphere by a predetermined arrangement algorithm, wherein the predetermined arrangement algorithm is an algorithm for approximately uniform spherical distribution of the unit vectors on the surface of the 3D sphere, the method comprising:
receiving a bitstream including the audio content;
extracting the number and the directivity gains from the bitstream; and
generating a set of directivity unit vectors by using the predetermined arrangement algorithm to distribute the number of unit vectors on the surface of the 3D sphere.
14. The method according to the preceding EEE, further comprising:
for a given target directivity unit vector pointing from the sound source towards a listener position, determining a target directivity gain for the target directivity unit vector based on the associated directivity gains of one or more among a group of directivity unit vectors that are closest to the target directivity unit vector.
15. The method according to the preceding EEE, wherein determining the target directivity gain for the target directivity unit vector involves:
setting the target directivity gain to the directivity gain associated with that directivity unit vector that is closest to the target directivity unit vector.
16. A method of decoding audio content including directivity information for at least one sound source, the directivity information comprising a first set of first directivity unit vectors representing directivity directions and associated first directivity gains, the method comprising:
receiving a bitstream including the audio content;
extracting the first set of directivity unit vectors and the associated first directivity gains from the bitstream;
determining, as a count number, a number of vectors for arrangement on a surface of a 3D sphere, wherein the number of unit vectors relates to a desired representation accuracy;
generating a second set of second directivity unit vectors by using a predetermined arrangement algorithm to distribute the determined number of unit vectors on the surface of the 3D sphere, wherein the predetermined arrangement algorithm is an algorithm for approximately uniform spherical distribution of the unit vectors on the surface of the 3D sphere;
determining, for the second directivity unit vectors, associated second directivity gains based on the first directivity gains of one or more among a group of first directivity unit vectors that are closest to the respective second directivity unit vector; and
for a given target directivity unit vector pointing from the sound source towards a listener position, determining a target directivity gain for the target directivity unit vector based on the associated second directivity gains of one or more among a group of second directivity unit vectors that are closest to the target directivity unit vector.
17. The method according to EEE 16, wherein determining the target directivity gain for the target directivity unit vector involves:
setting the target directivity gain to the second directivity gain associated with that second directivity unit vector that is closest to the target directivity unit vector.
18. The method according to EEE 16, further comprising:
extracting an indication from the bitstream of whether the second set of directivity unit vectors should be generated; and
determining the number of unit vectors and generating the second set of second directivity unit vectors if the indication indicates that the second set of directivity unit vectors should be generated.
19. An apparatus for processing audio content including directivity information for at least one sound source, the directivity information comprising a first set of first directivity unit vectors representing directivity directions and associated first directivity gains, the apparatus comprising a processor adapted to perform the steps of the method according to any one of EEEs 1 to 12.
20. An apparatus for decoding audio content including directivity information for at least one sound source, the directivity information comprising a number that indicates a number of approximately uniformly distributed unit vectors on a surface of a 3D sphere, and, for each such unit vector, an associated directivity gain, wherein the unit vectors are assumed to be distributed on the surface of the 3D sphere by a predetermined arrangement algorithm, wherein the predetermined arrangement algorithm is an algorithm for approximately uniform spherical distribution of the unit vectors on the surface of the 3D sphere, the apparatus comprising a processor adapted to perform the steps of the method according to any one of EEEs 13 to 15.
21. An apparatus for decoding audio content including directivity information for at least one sound source, the directivity information comprising a first set of first directivity unit vectors representing directivity directions and associated first directivity gains, the apparatus comprising a processor adapted to perform the steps of the method according to any one of EEEs 16 to 18.
22. A computer program including instructions that, when executed by a processor, cause the processor to perform the method according to any one of EEEs 1 to 18.
23. A computer-readable medium storing the computer program of EEE 22.

The invention claimed is:

1. A method of processing audio content including directivity information for at least one sound source, the directivity information comprising a first set of first directivity unit vectors representing directivity directions and associated first directivity gains, the method comprising:

determining, as a count number, a number of unit vectors for arrangement on a surface of a 3D sphere, wherein the number of unit vectors relates to a desired representation accuracy;

generating a second set of second directivity unit vectors by using a predetermined arrangement algorithm to distribute the determined number of unit vectors on the surface of the 3D sphere, wherein the predetermined arrangement algorithm is an algorithm for approximately uniform spherical distribution of the unit vectors on the surface of the 3D sphere; and determining, for the second directivity unit vectors, associated second directivity gains based on the first directivity gains of one or more among a group of first directivity unit vectors that are closest to the respective second directivity unit vector.

2. The method according to claim 1, wherein the number of unit vectors is determined such that the unit vectors, when distributed on the surface of the 3D sphere by the predetermined arrangement algorithm, would approximate the directions indicated by the first set of first directivity unit vectors up to the desired representation accuracy; and/or wherein the number of unit vectors is determined such that when the unit vectors were distributed on the surface of the 3D sphere by the predetermined arrangement algorithm, there would be, for each of the first directivity unit vectors in the first set, at least one among the unit vectors whose direction difference with respect to the respective first directivity unit vector is smaller than the desired representation accuracy.

3. The method according to claim 1, wherein determining the number of unit vectors involves using a pre-established functional relationship between representation accuracies and corresponding numbers of unit vectors that are distributed on the surface of the 3D sphere by the predetermined arrangement algorithm and that approximate the directions indicated by the first set of first directivity unit vectors up to the respective representation accuracy.

4. The method according to claim 1, wherein determining the associated second directivity gain for a given second directivity unit vector involves:

setting the second directivity gain to the first directivity gain associated with that first directivity unit vector that is closest to the given second directivity unit vector.

5. The method according to claim 1, wherein the predetermined arrangement algorithm involves superimposing a spiraling path on the surface of the 3D sphere, extending from a first point on the sphere to a second point on the sphere, opposite the first point, and successively arranging the unit vectors along the spiraling path, wherein the spacing of the spiraling path and the offsets between respective two adjacent unit vectors along the spiraling path are determined based on the number of unit vectors.

6. The method according to claim 1, wherein determining the number of unit vectors further involves mapping the number of unit vectors to one of predetermined numbers, wherein the predetermined numbers can be signaled by a bitstream parameter.

7. The method according to claim 1, wherein the desired representation accuracy is determined based on a model of perceptual directivity sensitivity thresholds of a human listener.

8. The method according to claim 1, wherein a second cardinality of the second set of second directivity unit vectors is smaller than a first cardinality of the first set of first directivity unit vectors.

9. The method according to claim 1, wherein the first and second directivity unit vectors are expressed in spherical or Cartesian coordinate systems.

10. The method according to claim 1, wherein the directivity information represented by the first set of first directivity unit vectors and associated first directivity gains is stored in the SOFA format; and/or wherein the directivity information represented by the second set of first directivity unit vectors and associated second directivity gains is stored in the SOFA format.

11. The method according to claim 1, wherein the method is a method of encoding the audio content and further comprises:

encoding the determined number of unit vectors together with the second directivity gains into a bitstream; and outputting the bitstream.

12. A method of decoding audio content including directivity information for at least one sound source, the directivity information comprising a number that indicates a number of approximately uniformly distributed unit vectors on a surface of a 3D sphere, and, for each such unit vector, an associated directivity gain, wherein the unit vectors are assumed to be distributed on the surface of the 3D sphere by a predetermined arrangement algorithm, wherein the predetermined arrangement algorithm is an algorithm for approximately uniform spherical distribution of the unit vectors on the surface of the 3D sphere, the method comprising:

receiving a bitstream including the audio content;

extracting the number and the directivity gains from the bitstream; and generating a set of directivity unit vectors by using the predetermined arrangement algorithm to distribute the number of unit vectors on the surface of the 3D sphere.

13. The method according to claim 12, further comprising:

for a given target directivity unit vector pointing from the sound source towards a listener position, determining a target directivity gain for the target directivity unit vector based on the associated directivity gains of one or more among a group of directivity unit vectors that are closest to the target directivity unit vector.

14. A method of decoding audio content including directivity information for at least one sound source, the directivity information comprising a first set of first directivity unit vectors representing directivity directions and associated first directivity gains, the method comprising:

receiving a bitstream including the audio content;

extracting the first set of directivity unit vectors and the associated first directivity gains from the bitstream;

determining, as a count number, a number of vectors for arrangement on a surface of a 3D sphere, wherein the number of unit vectors relates to a desired representation accuracy;

generating a second set of second directivity unit vectors by using a predetermined arrangement algorithm to distribute the determined number of unit vectors on the surface of the 3D sphere, wherein the predetermined arrangement algorithm is an algorithm for approximately uniform spherical distribution of the unit vectors on the surface of the 3D sphere;

determining, for the second directivity unit vectors, associated second directivity gains based on the first directivity gains of one or more among a group of first directivity unit vectors that are closest to the respective second directivity unit vector; and for a given target directivity unit vector pointing from the sound source towards a listener position, determining a target directivity gain for the target directivity unit vector based on the associated second directivity gains of one or more among a group of second directivity unit vectors that are closest to the target directivity unit vector.

15. The method according to claim 13, wherein determining the target directivity gain for the target directivity unit vector involves:

setting the target directivity gain to the second directivity gain associated with that second directivity unit vector that is closest to the target directivity unit vector.

16. The method according to claim 14, further comprising:

extracting an indication from the bitstream of whether the second set of directivity unit vectors should be generated; and determining the number of unit vectors and generating the second set of second directivity unit vectors if the indication indicates that the second set of directivity unit vectors should be generated.

17. A non-transitory computer program including instructions that, when executed by a processor, cause the processor to perform the method according to claim 1.

* * * * *